(12) United States Patent
Yamamoto

(10) Patent No.: US 9,879,731 B2
(45) Date of Patent: Jan. 30, 2018

(54) GEAR SPINDLE AND ROLLING MILL PROVIDED WITH SAME

(71) Applicant: PRIMETALS TECHNOLOGIES JAPAN, LTD., Tokyo (JP)

(72) Inventor: Kenji Yamamoto, Tokyo (JP)

(73) Assignee: PRIMETALS TECHNOLOGIES JAPAN, LTD., Tokyo (JP)

( * ) Notice: Subject to any disclaimer, the term of this patent is extended or adjusted under 35 U.S.C. 154(b) by 415 days.

(21) Appl. No.: 14/649,974

(22) PCT Filed: Nov. 14, 2013

(86) PCT No.: PCT/JP2013/080749
§ 371 (c)(1),
(2) Date: Jun. 5, 2015

(87) PCT Pub. No.: WO2014/087821
PCT Pub. Date: Jun. 12, 2014

(65) Prior Publication Data
US 2015/0314347 A1    Nov. 5, 2015

(30) Foreign Application Priority Data
Dec. 6, 2012  (JP) ................................ 2012-266901

(51) Int. Cl.
*F16H 37/04*    (2006.01)
*F16H 55/06*    (2006.01)
(Continued)

(52) U.S. Cl.
CPC .............. *F16D 3/185* (2013.01); *B21B 35/14* (2013.01)

(58) Field of Classification Search
CPC ............. F16H 55/08; F16H 55/06; F16H 1/12
(Continued)

(56) References Cited

U.S. PATENT DOCUMENTS 2,841,966 A    7/1958  Belden et al.
2,922,294 A    1/1960  Wildhaber
(Continued)

FOREIGN PATENT DOCUMENTS

JP    8-021453 A     1/1996
JP    10-231849 A    9/1998
(Continued)

OTHER PUBLICATIONS

International Search Report issued in PCT/JP2013/080749, dated Dec. 24, 2013.

*Primary Examiner* — Ha D Ho
(74) *Attorney, Agent, or Firm* — Birch, Stewart, Kolasch & Birch, LLP

(57) ABSTRACT

A gear spindle (3) obtained by inclining the axis of a spindle inner tube (10) provided at one end with an external cog inner tube gear section (40) at 0.6 degrees to 1.6 degrees with respect to the axis of a spindle outer tube (20) provided with an internal cog outer tube gear section (50) that meshes the inner tube gear section (40). On the teeth of the inner tube gear section (40) having a face width (B), a crowning of radius (Cr) is provided so that the center in the face width direction is expanded and both tooth ends are thin. The face width (B) and the crowning radius (Cr) are set within an area that is enclosed by graphs of (Cr)=1200 [mm], (Cr)=4000 [mm], (B)=0.0272×(Cr)+28 [mm], (B)=59.04×exp (0.0005× (Cr)) [mm], and (B)=32×(Cr)$^{0.274}$ [mm].

10 Claims, 6 Drawing Sheets

(51) Int. Cl.
 *F16H 55/08* (2006.01)
 *F16D 3/18* (2006.01)
 *B21B 35/14* (2006.01)

(58) Field of Classification Search
 USPC .......................................... 74/640, 457, 468
 See application file for complete search history.

(56) References Cited

U.S. PATENT DOCUMENTS

| | | | |
|---|---|---|---|
| 3,224,223 A | | 12/1965 | Wildhaber |
| 3,232,075 A | * | 2/1966 | Wildhaber ............... F16D 3/185 464/158 |
| 3,243,973 A | | 4/1966 | Kraeling |
| 3,292,390 A | | 12/1966 | Wildhaber |
| 3,477,250 A | * | 11/1969 | Gregorich ................ F16D 23/06 192/53.2 |
| 3,899,270 A | * | 8/1975 | Swedberg .............. B62D 5/097 418/61.3 |
| 4,132,090 A | * | 1/1979 | McDermott ............. B23F 5/24 409/12 |
| 6,026,700 A | | 2/2000 | Mancuso et al. |
| 6,093,106 A | | 7/2000 | Shigeura |

FOREIGN PATENT DOCUMENTS

| | | |
|---|---|---|
| JP | 2002-021871 A | 1/2002 |
| JP | 2004-211789 A | 7/2004 |
| JP | 2005-187850 A | 7/2005 |
| JP | 2012-67650 A | 4/2012 |

* cited by examiner

GEAR SPINDLE AND ROLLING MILL PROVIDED WITH SAME

TECHNICAL FIELD

The present invention relates to a gear spindle and a rolling mill equipped with the same.

BACKGROUND ART

The work rolls of rolling mills are rotationally driven by an electric motor. The rotationally driving power is transmitted from the electric motor to the pair of upper and lower work rolls through a transmission having a power distributing function and through a pair of spindles.

The type of spindles used varies depending on how its use, such as rolling conditions. For example, UJ spindles (Universal Joint, also called propeller shafts) are used in rolling mills for rolling materials with normal hardness, and gear spindles are used in hard material rolling mills for rolling materials with relatively high hardness (e.g. a material with a 40%-reduction deformation resistance value of 70 [kg/mm$^2$]).

High tensile strength steels which are even harder materials (also called high tensile materials, e.g. a material with a 40%-reduction deformation resistance value of 130 [kg/mm$^2$]) have been developed for the purpose of making structures such as automobiles stronger and lighter. Thus, there have been needs for high tensile strength steel rolling mills for rolling high tensile strength steels, and there have accordingly been needs for high performance gear spindles for use in high tensile strength steel rolling mills. These high performance gear spindles usable in high tensile strength steel rolling mills are required to satisfy conditions (1), (2), and (3) described below.

(1) Small Diameter

High tensile strength steel rolling mills use work rolls with smaller diameters than normal cases so as to suppress increase in rolling force. The work rolls are formed of a pair of upper and lower rolls, and are independently coupled to their own gear spindles and rotationally driven when rolling power (rotational power) is transmitted thereto through the gear spindles. Thus, the gear spindles are formed of a pair of upper and lower gear spindles like the work rolls. A portion of the gear spindles coupled to their work rolls needs to have a diameter smaller than the work rolls' diameter so that the gear spindles installed in a pair on the upper and lower sides will not interfere with each other.

For example, in a hard material rolling mill, a work roll diameter $D_W$ is 330 [mm], and a gear-spindle outer diameter D is 325 [mm]. On the other hand, in a high tensile strength steel rolling mill, the work roll diameter $D_W$ is required to be 250 [mm] to limit the rolling force, and the gear-spindle outer diameter D is required to be 245 [mm] to prevent the vertical interference between the gear spindles.

Here, the work roll diameter $D_W$ is the minimum usable diameter. As the work rolls are used for rolling, their surfaces become worn due to the contact with the rolling target strips, and the surfaces are often polished with a polishing machine. Accordingly, the work roll diameter $D_W$ gradually becomes smaller with use. The difference between the largest diameter and the smallest diameter of work rolls is generally around 10% approximately.

(2) Ability to Transmit Larger Torque

Rolling torque T of a rolling mill is influenced by a deformation resistance value F of the rolling target strip and the work roll diameter $D_W$ and is therefore such that $T \propto f(F) + f(D_W)$. As mentioned earlier, the work roll diameters $D_W$ of high tensile strength steel rolling mills are smaller than the work roll diameters $D_W$ of hard material rolling mills, and the deformation resistance values of high tensile strength steels are significantly larger than the deformation resistance values of conventional hard materials. Thus, rolling torque required for the rolling of high tensile strength steels is larger than rolling torque required for the rolling of conventional hard materials.

For example, a strength index $T/D^3$ of allowable transmission torque $T_a$ of each gear spindle in a conventional hard material rolling mill (T: necessary transmission torque per gear spindle [ton·m], D: gear-spindle outer diameter [mm]) is such that $T/D^3 \leq 0.4$ [ton/m$^2$], while the strength index $T/D^3$ of the allowable transmission torque $T_a$ of each gear spindle in a high tensile strength steel rolling mill is such that $T/D^3 \approx 0.6$ to 0.8 [ton/m$^2$]. As described above, as the deformation resistance value of the rolling target strip increases, the strength index $T/D^3$ of the allowable transmission torque $T_a$ increases as well. (The strength index $T/D^3$ [ton/m$^2$] of the allowable transmission torque $T_a$ is an expression omitting "×10$^9$." To be precise, the expression is $(T/D^3) \times 10^3$ [ton/m$^2$] because the gear-spindle outer diameter D [mm] is plugged in after unit conversion into a gear-spindle outer diameter $D \times 10^{-3}$ [m]. Hereinbelow, in this description, the strength index of the transmission torque T with respect to the gear-spindle outer diameter D [mm] will be expressed as $T/D^3$ [ton/m$^2$] in the same short form as above.)

(3) Ability to Rotate at High Speed

The production performance of a rolling mill is expressed by a multiplier of the strip thickness, the strip width, and the rolling speed. In general, rolled products are produced from rolling target strips with a fixed strip thickness and strip width, and the production performance of a rolling mill is dependent on its rolling speed. Rolling speed V of a rolling mill is influenced by the work roll diameter $D^W$ and work roll rotational speed N, and is therefore such that $V \propto D_W \times N$. As mentioned earlier, the work roll diameters $D_W$ of high tensile strength steel rolling mills are smaller than the work roll diameters $D_W$ of hard material rolling mills. Thus, with the same rotational speed N, the rolling speeds V of the high tensile strength steel rolling mills are inevitably lower, and the production performance of the rolling mills is lower as well. Then, in order to ensure the same production performance as the hard material rolling mills, the high tensile strength steel rolling mills need to rotate their work rolls at higher speeds than the hard material rolling mills. In other words, the high tensile strength steel rolling mills require gear spindles capable of high speed rotation.

For example, in the case of a conventional hard material rolling mill including work rolls with a work roll diameter $D_W$ of 330 [mm], its gear spindles are required to have specifications which can handle a rotational speed of 1930 [rpm] to achieve production performance equivalent to a rolling speed of 2000 [mpm]. However, in a case of a high tensile strength steel rolling mill with a smaller work roll diameter $D_W$ of 250 [mm], its gear spindles are required to have high speed rotation specifications which can handle a rotational speed of 2546 [rpm], which is approximately 1.3 times larger than the rotational speed in the conventional case, to achieve the same production performance as above equivalent to a rolling speed of 2000 [mpm].

It is generally known that as rotation of a rotary body becomes faster, the rotary body may exhibit flexural vibration, rattling vibration, torsional vibration, or the like, and resonance or the like may greatly influence the rotary body.

In the case of a rolling mill, its gear spindles, which are rotary bodies, may easily break due to the resonance. Even if the resonance does not occur, the vibration is still transmitted to the rolling target strip and results in uneven strip thickness, a poor strip shape, and poor surface texture, which can cause a significant quality loss to the rolling target strip. For this reason, gear spindles capable of high speed rotation need to be resistant to vibration. Specifically, gear spindles which are light and short and in which gaps with less backlash are required.

For example, a resonance rotational speed He indicative of the likelihood of vibration of a rotary body such as a gear spindle is influenced by the outer diameter D of the rotary body and the length L of the rotary body and is therefore such that $Nc \propto (D)/f(L)$. In other words, the smaller the outer diameter of the rotary body, the more likely that resonance will occur, and the longer the rotary body, the more likely that resonance will occur.

The functions required for gear spindles for high tensile strength steel rolling described above have a problem of interfering with other functions.

The allowable transmission torque $T_a$ of a gear spindle is dependent on an inclination angle $\theta$ at which the gear spindle is used and on the gear-spindle outer diameter D. The smaller she inclination angle $\theta$ and the larger the gear-spindle outer diameter D, the larger the allowable transmission torque $T_a$ of the gear spindle. Thus, the allowable transmission torque $T_a$ is such that $T_a \propto f(D)/f(\theta)$. The gear spindle is rotated with one side coupled to a transmission and the other side coupled to a work roll. Thus, if the height of the axis of the work roll and the height of the axis of the transmission are the same, the inclination angle $\theta$ of the gear spindle is 0°, which is the optimal condition in view of strength.

In the case of a high tensile strength steel rolling mill, however, the work roll diameter must be smaller than normal cases so as to limit the rolling load, while the size of the transmission must be increased for transmitting high torque. Hence, the difference between the height of the axis of the transmission and the height of the axis of the work roll is larger than conventional cases. Accordingly, the inclination angle $\theta$ of a gear spindle for high tensile strength steel rolling is inevitably larger than those of normal gear spindles, meaning that the allowable transmission torque of the gear spindle is less than normal cases.

To avoid this, that is, to make the gear spindle inclination angle $\theta$ equal to or smaller than normal cases under the condition where a difference $\Delta H$ between the heights of the two axes is large, the gear spindle length L needs to be increased to reduce the increase in the gear spindle inclination angle $\theta$ caused by the increase in the difference $\Delta H$ between the heights of the two axes, as can be figured out from $\tan \theta = \Delta H/L$. However, there is the problem in that a gear spindle for high tensile strength steel rolling is more likely to vibrate due to its small outer diameter, and also the vibration is even more likely to occur if the gear spindle length L is increased. Thus, reducing the inclination angle $\theta$ is difficult co achieve with current techniques.

Meanwhile, it is assumed that in the future, ultra-high tensile strength steels harder than high tensile strength steels will be developed and that rolling mills for rolling the ultra-high tensile strength steels, and higher performance gear spindles capable of handling such rolling will be required. In other words, for the conditions (1), (2), and (3) described above, it is necessary to realize an even smaller diameter, greater allowable transmission torque, and faster rotation than conventional cases.

PRIOR ART DOCUMENT

Patent Document

Patent Document 1: Japanese Patent Application Publication No. Hei 8-21453

SUMMARY OF THE INVENTION

Problems to be Solved by the Invention

Patent Document 1, for example, describes a gear spindle in a rolling mill for rolling relatively hard materials. It is a technique which involves providing a lubricating-oil supply hole and supplied-oil-amount detection holes in an oil chamber so as to prevent lubricating oil from pressurizing a seal member and breaking the sealing member and eliminate the possibility of leakage of the lubricating oil from the broken part of the seal member. In this way, the amount of time taken to supply the lubricating oil and replace the seal member can be reduced.

Moreover, under the assumption that external teeth provided on an inner tube may be damaged, the technique provides a structure in which the inner tube is divided into a hub with external teeth and a gear spindle, and they are detachably attached to each other with a spline therebetween. This divided structure has a possibility of a slight decrease in gear spindle strength, but the structure emphasizes quick replacement of the inner tube's external teeth in case of breakage thereof over such a disadvantage.

However, as mentioned earlier, rolling ultra-high tensile strength steel requires a gear spindle having an even higher strength and an even smaller diameter than the conventional gear spindles, and therefore the conventional ones cannot handle the rolling.

One purpose of using a gear spindle is to realize rotation while tolerating the difference ($\Delta H$) between the axes on both sides (the work roll side and the transmission side) in the height direction. Thus, the inner teeth of the outer tube are formed as spur teeth while the outer teeth of the inner tube are crowned such that each tooth is thicker at the center than at the opposite ends. This crowning prevents the teeth of the inner tube and the outer tube of a coupling from interfering with each other due to the difference between the two axes ($\Delta H$) and locking the coupling. In view of this, in the conventional practice, it has been considered desirable to preferentially secure a large margin for the locking and not to make the crown radius too large.

Tooth surface pressure, tooth-root bending stress, and PV value may be considered factors that determine the allowable transmission torque of a gear spindle. Here, tooth-surface pressure strength has been, significantly improved by recent years' progress in tooth surface heat treatment, specifically, recent years' progress from thermal refining treatment to nitriding treatment, radio frequency treatment, and carburizing treatment. Thus, the factors that determine the allowable transmission torque are currently tooth-root bending stress and PV value, and progress is desired in these directions.

Major parameters that determine tooth-root bending stress $\sigma$ have conventionally been torque T, inclination angle $\theta$, gear-spindle outer diameter D, and facewidth B, and $\sigma \propto T \times f(\theta)/(D^2 \times B)$ is assumed. In other words, a crown radius has not been considered a tooth-root strength parameter.

Here, while the inner teeth of the outer tube of the gear coupling are formed as spur teeth, the outer teeth of the inner tube are crowned along the facewidth direction. Thus, the gears in the gear spindle are based on a contact model which can be described as a flat plate and a circular cylinder touching each other along the facewidth direction. Specifically, the teeth of the outer tube and the inner tube are in contact with each other at a Hertzian flat region and do not receive load at the entire region along the facewidth direction. Thus, the tooth-root bending stress σ is such that $\sigma \propto T \times f(\theta)/(D^2 \times Bh)$, where Bh is an effective facewidth $Bh=f(Cr, T)$ and dependent on the crown radius Cr and the load torque T. Moreover, the effective facewidth Bh is generally such that $0<Bh/B<<1.0$ In summary, the crown radius Cr is an important parameter for tooth root strength. Increasing the crown radius Cr makes the teeth flatter and widens the load receiving range of each tooth on the pitch circle diameter in the facewidth direction and therefore widens the load distributing range at each tooth root. Accordingly, the tooth root strength improves drastically.

On the other hand, if the crown radius Cr is increased to an unnecessary extent, the necessary facewidth and necessary backlash become large, which may impair high speed rotation and lower the strength of parts of the gear spindle other than the teeth. As a result, the performance of the whole gear spindle may be lowered. Thus, it is impossible to satisfy the above-described condition required for a gear spindle for high tensile strength steel rolling.

The present invention has been made in view of the above-described problems, and an object thereof is to enable high speed rolling and also to improve the tooth-surface pressure strength, tooth root bending strength, and PV value by selecting an appropriate combination of a crown radius and a facewidth.

The strength of a gear spindle has conventionally been determined based on the pitch circle diameter of its gear. However, based on the finding that the strength of the gear can be increased by increasing the crown radius of the gear, the present invention has realized a high-speed, high-strength, and small-diameter spindle taking into consideration both the amount of backlash and tooth-root bending stress which have not conventionally been taken into consideration.

Means for Solving the Problems

A gear spindle according to a first invention for solving the above-described problems is a gear spindle in which an axis of a spindle inner tube and an axis of a spindle outer tube are inclined with respect to each other at 0.6 degrees to 1.6 degrees, the spindle inner tube having an inner-tube gear portion being an external gear on one end side, the spindle outer tube having an outer-tube gear portion being an internal gear configured to be fitted to the inner-cube gear portion, characterized in that teeth of the inner-tube gear portion having a facewidth B are each provided with a crown of a radius Cr such that the tooth is thicker at the center and thinner at opposite tooth ends along a facewidth direction, and the facewidth B and the crown radius Cr are set within a range defined $Cr=1200$ [mm], $Cr=4000$ [mm], $B=0.0272 \times Cr+28$ [mm], $B=59.04 \times exp(0.0005 \times Cr)$ [mm], and $B=32 \times Cr^{0.247}$ [mm] in a graph.

A gear spindle according to a second invention for solving the above-described problems is the first invention, characterized in that $B=0.0272 \times Cr+23$ [mm] is a straight line obtained by connecting a large number of points each of which is a set of a given crown radius Cr and a minimum facewidth under a condition where the inclination angle is 0.6 degrees, the minimum facewidth being such that the teeth of the inner-tube spindle do not contact at the tooth ends thereof under the condition where the crown radius Cr is given, $B=59.04 \times exp(0.0005 \times Cr)$ [mm] is a curved line obtained by connecting a large number of points each of which is a set of a crown radius Cr and 40 [mm] plus a minimum facewidth under a condition where a given inclination angle is set within the range of 0.6 degrees to 1.6 degrees, the crown radius Cr being such that tooth-root bending stress to be applied to the inner-tube gear portion is a maximum allowable value, the minimum facewidth being such that the teeth of the spindle inner tube do not contact at the tooth ends thereof under the condition where the crown radius Cr is given, and $B=32 \times Cr^{0.247}$ [mm] is a curved line obtained by connecting a large number of points each of which is a set of a given crown radius Cr and a facewidth B being 40 [mm] plus a minimum facewidth under a condition where a given inclination angle is set within the range of 0.6 degrees to 1.6 degrees, and a backlash required for the combination of the crown radius Cr and the facewidth B is an allowable maximum backlash between the inner-tube gear portion and the outer-tube gear portion, the minimum facewidth being such that the teeth of the inner-tube spindle do not contact at the tooth ends thereof under the condition where the crown radius Cr is given.

A gear spindle according to a third invention for solving the above-described problems is a gear spindle in which an axis of a spindle inner tube and an axis of a spindle outer tube are inclined with respect to each other at 0.6 degrees to 1.6 degrees, the spindle inner tubs having an inner-tube gear portion being an external gear on one end side, the spindle outer tube having an outer-tube gear portion being an internal gear configured to be fitted to the inner-tube gear portion, characterized in that teeth of the inner-tube gear portion are each provided with a crown of a radius Cr such that the tooth is thicker at the center and thinner at opposite tooth ends along a facewidth direction, and the facewidth B and the crown radius Cr are set within a range defined $Cr=1200$ [mm], $Cr=4000$ [mm], $B=0.0272 \times Cr+28$ [mm], $B=18 \times exp(0.001 \times Cr)$ [mm], and $B=10 \times Cr^{0.292}$ [mm] in a graph.

A gear spindle according to a fourth invention for solving the above-described problems is the third invention, characterized in that $B=0.0272 \times Cr+28$ [mm] is a straight line obtained by connecting a large number of points each of which is a set of a given crown radius Cr and a minimum facewidth under a condition where the inclination angle is 0.6 degrees, the minimum facewidth being such chat the teeth of the inner-tube spindle do not contact at the tooth ends thereof under the condition where the crown radius Cr is given, $B=18 \times exp(0.001 \times Cr)$ [mm] is a curved line obtained by connecting a large number of points each of which is a set of a crown radius Cr and a minimum facewidth under a condition where a given inclination angle is set within the range of 0.6 degrees to 1.6 degrees, the crown radius Cr being such that tooth-root bending stress to foe applied to the inner-tube gear portion is a maximum allowable value, the minimum facewidth being such that the teeth of the spindle inner tube do not contact at the tooth ends thereof under the condition where the crown radius Cr is given, and $B=19 \times Cr^{0.292}$ [mm] is a curved line obtained by connecting a large number of points each of which is a set of a given crown radius Cr and a minimum facewidth under a condition where a given inclination angle is set within the range of 0.6 degrees to 1.6 degrees, and a backlash required for the combination of the crown radius Cr and the facewidth B is an allowable maximum backlash between the inner-tube gear portion and the outer-tube gear portion, the minimum facewidth being such that the teeth of the inner-tube spindle do not contact at the tooth ends thereof under the condition where the crown radius Cr is given.

A gear spindle according to a fifth invention for solving the above-described problems is any one of the first to fourth inventions, characterized in that shot blasting is performed on tooth surfaces.

A gear spindle according to a sixth invention for solving the above-described problems is any one of the first to fourth inventions, characterized in that manganese phosphate coating treatment is performed on tooth surfaces.

A gear spindle according to a seventh invention for solving the above-described problems is any one of the first to seventh inventions, characterized in that molybdenum disulfide coating treatment is performed on tooth surfaces.

A gear spindle according to an eighth invention for solving the above-described problems is any one of the first to fourth inventions, characterized in that tooth surface lubricant and tooth surfaces of the spindle outer tube and the spindle inner tube are forcibly cooled by spraying cooling fluid onto outer surfaces of the spindle outer tube and the spindle inner tube.

A gear spindle according to a ninth invention for solving the above-described problems is any one of the first to eighth inventions, characterized in that given that a pitch circle diameter of the inner-tube gear portion is $D_P$ [mm], a gear pressure angle is $\alpha$ [degree], a gear module is Mn [mm], the crown radius is Cr [mm], the facewidth is B [mm], a minimum diameter of a portion from a tooth end portion of the inner-tube spindle to a neck portion thereof is d [mm], and a radius of curvature of an arc shape given at a tooth tip is $R = Cr \times \tan \alpha$ [mm], $$d \geq D_P - 2 \times \left[ R - \left\{ R^2 - \left( \frac{B}{2} \right)^2 \right\}^{\frac{1}{2}} + (Mn + 5) \right] [\text{mm}] \quad \text{[Formula 1]}$$

is satisfied.

A rolling mill according to a tenth invention for solving the above-described problems is a rolling mill including: a pair of upper and lower work rolls for rolling a rolling target strip; a pair of upper and lower gear spindles coupled to the pair of upper and lower work rolls, independently and respectively, and configured to transmit rotational power to the pair of upper and lower work rolls, independently and respectively; a transmission coupled to the pair of upper and lower gear spindles; a gear coupling coupled to the transmission and configured to transmit rotational power to the transmission; and an electric motor coupled to the gear coupling and configured to supply rotational power to the gear coupling, characterized in that each of the gear spindles is the gear spindle according to any one of the first to ninth inventions.

Effects of the Invention

According to the gear spindle of the first invention, 1200 [mm]≤Cr≤4000 [mm] is a range with which improvement in allowable transmission torque can be expected and which is practically usable. By setting the crown radius Cr within this range, the allowable transmission torque can be improved without any possibility of breakage at the neck portion of the spindle inner tube. Increasing the crown radius Cr widens the load distributing range at each tooth root and thereby improves the tooth root strength. Specifically, widening the load distributing range at each tooth root improves the tooth root strength, which in turn improves the spindle strength (surface pressure, bending, PV value). Thus, the spindle inclination angle does not need to be reduced more than necessary, and the spindle length can be shortened. Accordingly, a small-diameter and high-speed-rotation spindle can be realized. Note that increasing the crown radius Cr beyond the above range reduces the neck diameter d of the neck portion and increases the torsional stress in the neck portion. Consequently, excessively large load will be applied to the neck portion of the spindle inner tube.

According to the gear spindle of the second invention, B≤59.04×exp(0.0005×Cr) [mm] is a state where the tooth-root bending stress is not exceeding its allowable value. Accordingly, rotational power can be transmitted with large torque without any teeth being fractured by the tooth-root bending stress. Further, B≤32×Cr$^{0.247}$ [mm] is a state the backlash amount is not exceeding its allowable value. Accordingly, rotational power can be transmitted with large torque without poor mesh due to excessive increase in backlash amount.

According to the gear spindle of the third invention, 1200 [mm]≤Cr≤4000 [mm] is a range with which improvement in allowable transmission torque can be expected and which is practically usable. By setting the crown radius Cr within this range, the allowable transmission torque can be improved without any possibility of breakage at the neck portion of the spindle inner rube. Note that increasing the crown radius Cr beyond the above range reduces the neck diameter d of the neck portion and increases the torsional stress in the neck portion. Hence, there will be a possibility of breakage at the neck portion of the spindle inner tube.

According to the gear spindle of the fourth invention, B≤18×exp (0.001×Cr) [mm] is a state where the tooth-root bending stress is not exceeding its allowable value. Accordingly, the gear spindle can handle high speed rotation and large transmission torque without any possibility of tooth fracture. Further, B≤19×Cr$^{0.292}$ [mm] is a state the backlash amount is not exceeding its allowable value. Accordingly, the gear spindle can handle high speed rotation and large transmission torque without poor mesh due to excessive increase in backlash amount. Furthermore, margins for use such as machining errors and deterioration with time is not taken into consideration, without decreasing the allowable transmission torque of each tooth. Accordingly, the cost, weight, and size can be further reduced.

According to the gear spindle of the fifth invention, fine dimples are created in the tooth surfaces. By maintaining oil in the dimples, oil film shortage can be prevented. Thus, it is possible to prevent seizure of the tooth surfaces of the inner-tube gear portion and the outer-tube gear portion. Since the seizure of the tooth surfaces will not occur even in the case of transmitting large torque, the allowable transmission torque of the gear spindle can be further improved.

According to the gear spindle of the sixth invention, a manganese phosphate film is porous crystals. Thus, the film has an oil retaining ability and also has good initial conformability. Accordingly, the generation of frictional heat can be reduced, and the seizure of the tooth surfaces of the inner-tube gear portion and the outer-tube gear portion can be prevented. Since the seizure of the tooth surfaces will not occur even in the case of transmitting large torque, the allowable transmission torque of the gear spindle can be further improved.

According to the gear spindle of the seventh invention, solid lubricant is baked on the tooth surfaces. Thus, in case of oil shortage, the solid lubricant can prevent metal contact. Accordingly, the seizure of the tooth surfaces of the inner-tube gear portion and the outer-tube gear portion can be prevented. Since the seizure of the tooth surfaces will not occur even in the case of transmitting large torque, the allowable transmission torque of the gear spindle can be further improved.

According to the gear spindle of the eighth invention, the external forced cooling of the outer surface of the spindle outer tube reduces increase in the temperature of the contacting portions. Accordingly, the resistance to seizure is improved.

According to the gear spindle of the ninth invention, the neck diameter is increased without affecting the crowning. Thus, the torsional strength of the neck portion is increased. Accordingly, the possibility of breakage at the neck portion can be reduced.

According to the rolling mill of the tenth invention, the rolling mill can handle high speed rotation and large transmission torque without having poor mesh due to excessive backlash increase or experiencing tooth fracture due to the tooth-root bending stress exceeding the allowable tooth-root bending stress. Moreover, since the torsional stress in the neck portion of the spindle inner tube of the gear spindle is reduced, the possibility of teeth breakage is reduced. Also, the surface pressure at the tooth surfaces of the inner-tube gear portion and the outer-tube gear portion of the gear spindle is reduced. Accordingly, the possibility of seizure at the tooth surfaces is reduced.

MODES FOR CARRYING OUT THE INVENTION

As described above, in a gear spindle according to the present invention, the teeth of an inner-tube gear portion having a facewidth B are each provided with a crown of a radius Cr such that the tooth is thicker at the center and thinner at the opposite tooth ends along the facewidth direction, and the facewidth B and the crown radius Cr are set within a range defined by Cr=1200 [mm], Cr=4000 [mm], B=0.0272×Cr+28 [mm], B=59.04×exp (0.0005×Cr) [mm], and B=32×Cr$^{0.247}$ [mm] in a graph.

In other words, as the shape of the inner-tube gear portion of the gear spindle, the crown radius Cr is set to 1200 [mm] to 4000 [mm], which is significantly larger than conventional cases, and a facewidth B suitable for the crown radius Cr is figured out from a relationship defined by graphical representations of the function B=0.0272×Cr+28 [mm] based on elements which are the inclination angle during use and edge contact at the tooth ends, the B=59.04×exp (0.0005×Cr) [mm] based on an element which is the tooth-root bending stress, and the function B=32×Cr$^{0.247}$ [mm] based on an element which is the backlash amount.

Hereinbelow, embodiments of a gear spindle and a rolling mill equipped with the same according to the present invention will be described in detail with reference to the accompanying drawings. It is needless to say that the present invention is not limited to the following embodiments and various changes can be made without departing from the gist of the present invention, as a matter of course.

Embodiment 1

A gear spindle and a rolling mill equipped with the same according to Embodiment 1 of the present invention will be described with reference to FIGS. 1 to 7.

Figure 2:
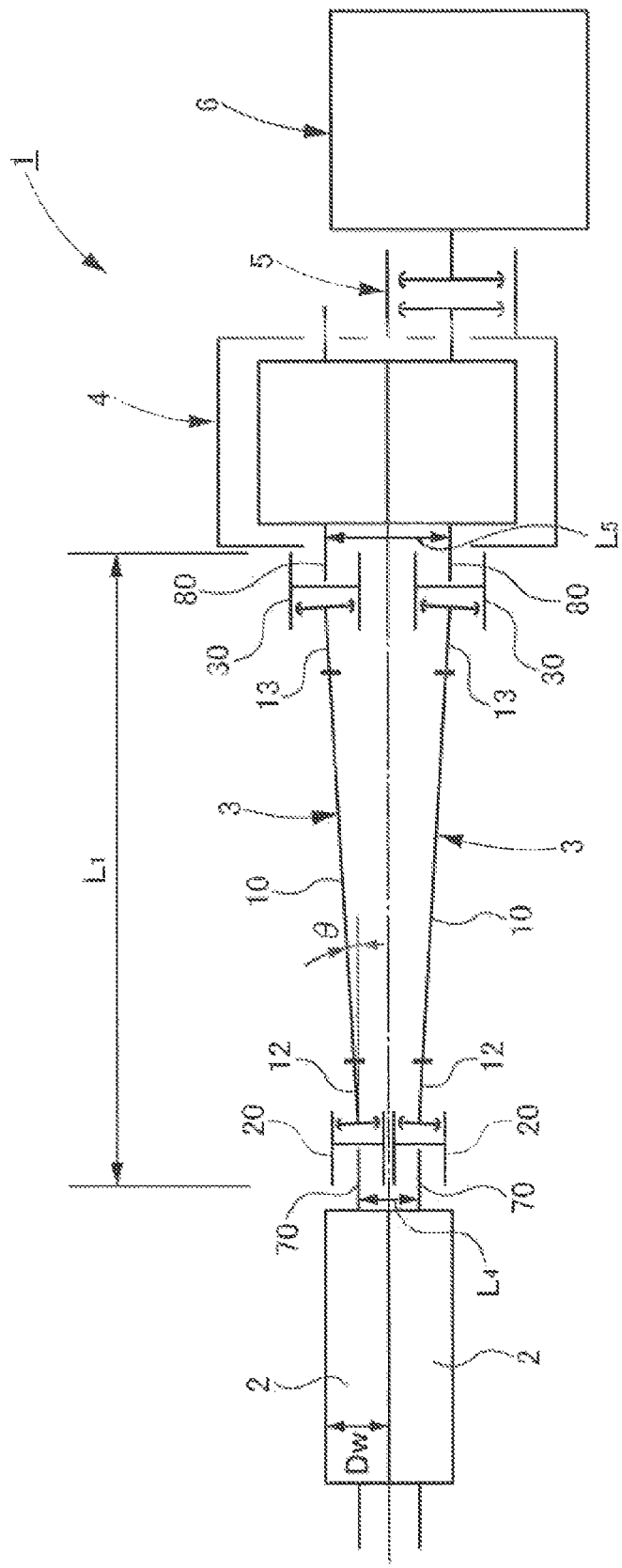
FIG. 2 is a schematic diagram showing an entire drive system of the rolling mill according to Embodiment 1 of the present invention.

As shown in FIG. 2, a rolling mill 1 of this embodiment includes: a pair of upper and lower work rolls 2 for rolling a rolling target strip; a pair of upper and lower gear spindles 3 coupled to the pair of upper and lower work rolls 2, independently and respectively, and configured to transmit rotational power to the pair of upper and lower work rolls 2, independently and respectively; a transmission 4 coupled to the pair of upper and lower gear spindles 3 and configured to change the speed of rotational power to a predetermined rotational speed and distribute the changed rotational power to the pair of upper and lower gear spindles 3; a gear coupling 5 coupled to the transmission 4 and configured to transmit rotational power to the transmission 4; and an electric motor S coupled to the gear coupling 5 and configured to supply rotational power to the gear coupling 5.

Each gear spindle 3 includes: a middle shaft 10 disposed in the middle of the gear spindle 3; a spindle inner tube 12 and a spindle outer tube 20 provided at one end side of the middle shaft 10 and coupling the middle shaft 10 and the work roll 2 to each other; and a spindle inner tube 13 and a spindle outer tube 30 provided at the other end side of the middle shaft 10 and coupling the middle shaft 10 and the transmission 4 to each other.

Figure 1:
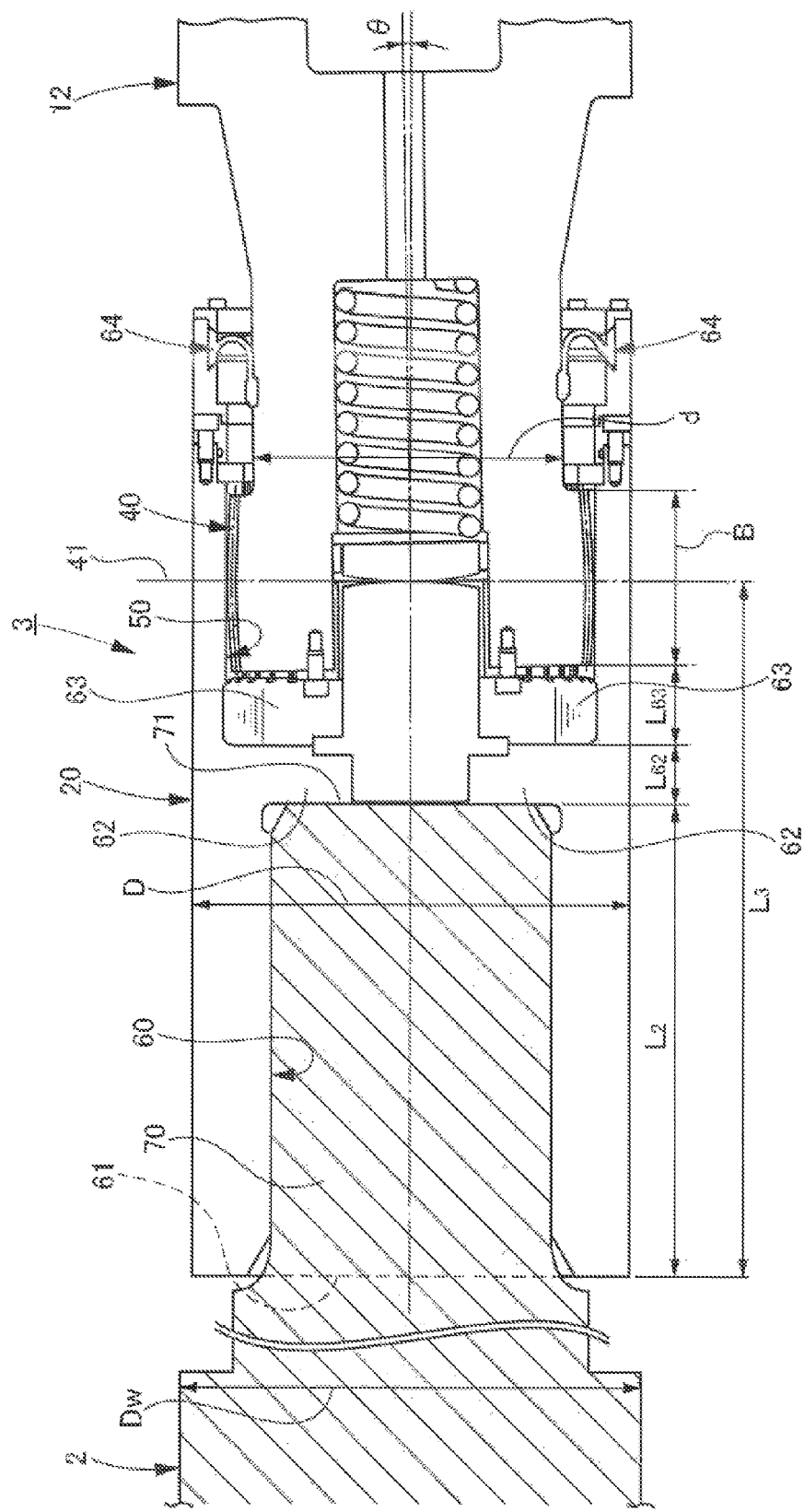
FIG. 1 is a longitudinal cross-sectional view of coupling portions of a gear spindle and a work roll in a rolling mill according to Embodiment 1 of the present invention.

As shown in FIG. 1, an inner-tube gear portion 40 (external teeth) provided on one end side of the spindle inner tube 12 and an outer-tube gear portion 50 (internal tooth) provided on one end side of the spindle outer tube 20 are fitted to each other. A fitting hole 60 of an oval sectional shape provided on the other end side of the spindle outer tubs 20 (hereinafter, the oval hole 60) and a fitting protrusion 70 of an oval sectional shape provided at an end portion of the work roll 2 (hereinafter, the work-roll oval portion 70) are fitted to each other.

A strength index of allowable transmission torque $T_a$ of each gear spindle 3 of this embodiment satisfies $T/D^3 \leq 0.8$ to 1.0 [ton/m²] under the optimal conditions, which is approximately twice greater than conventional cases ($T/D^3 \leq 0.4$ [ton/m²]), so that ultra-high tensile strength steels can be rolled. Here, T denotes transmission torque [ton·m] to be transmitted to the work roll 2 through the gear spindle 3, and D denotes the gear-spindle outer diameter [mm] at the spindle outer tube 20.

The allowable transmission torque $T_a$ of the gear spindle 3 is dependent not only on the gear-spindle outer diameter D but also on a later-described inclination angle θ, crown radius Cr, facewidth B, and the like. The inclination angle θ and the gear-spindle outer diameter D are numerical values determined by external factors, and therefore the degree of freedom in setting these is rather low. On the other hand, the crown radius Cr and the facewidth B are numerical values determined by design, and therefore the degree of freedom in setting these is high. For this reason, in this embodiment, the later-described crown radius Cr and facewidth B are optimally set within a numerical value setting to be described below so that the allowable transmission torque $T_a$ of the gear spindle 3 can be improved to be higher than conventional cases.

First, the gear spindle 3 and the rolling mill 1 equipped with the same as this embodiment will be described.

As shown in FIG. 1, the gear-spindle outer diameter D is set to be slightly smaller than a work-roll diameter Dw so that the upper and lower spindle outer tubes 20 in the pair of upper and lower gear spindles 3 coupled to the work rolls 2 will not interfere with each other. In the case of the rolling mill 1 of this embodiment including the small-diameter work rolls 2, the gear-spindle outer diameter D is set such that D=225 [mm] to 340 [mm].

It is known that a rotary structure vibrates more easily when the entire length is long than when the entire length is short, and also that a rotary structure vibrates more easily when the outer diameter is small than when the outer diameter is large. Here, in a case of a high tensile strength steel rolling mill, its gear spindles are made to have a small diameter and are rotationally driven at high speed. Hence, the gear spindles easily vibrate due to their diameter and also their rotational speed. For this reason, in this embodiment, an entire length $L_1$ (FIG. 2) of each gear spindle 3 needs to be as short as possible.

The spindle outer tube 20 and the work roll 2 are fitted such that a small gap is provided between the work-roll oval portion 70 and the oval hole 60 of the spindle outer tube 20 to permit assembly and disassembly. However, this gap sometimes causes rattling vibration of the gear spindle 3. Rattling vibration is likely to occur between the spindle outer tube 20 and the work roll 2 in a case where a center length $L_3$ being the distance from an open end 61 of the oval hole 6 to a facewidth center 41 of the inner-tube gear portion 40 is longer by a certain amount than a fitting length $L_2$ of the work-roll oval portion 70 and the oval hole 60. Thus, $L_2/L_3$ should be as large as possible in view of preventing the vibration. In this embodiment, the fitting length $L_2$ and the center distance $L_3$ are set such that $(L_2/L_3) \geq 0.65$.

Meanwhile, if the fitting length $L_2$ is increased more than necessary, both the work roll 2 and the gear spindle 3 become long, which is disadvantageous in view of preventing the vibration. For this reason, the fitting length $L_2$ needs to be as short as possible. Then, in a case where the fitting length $L_2$ is fixed, the center distance $L_3$ is preferably short.

Here, the center distance $L_3$ is equal to $L_2+L_{62}+L_{63}+B/2$, where $L_{62}$ is the thickness of a separating wall 62 separating the oval hole 60 and the outer-tube gear portion 50 of the spindle outer tube 20, $L_{63}$ is the width of a lubricating oil chamber 63 provided to supply lubricating oil to the outer-tube gear portion 50 and the inner-tube gear portion 40, and B is the facewidth or the inner-tube gear portion 40. In order to secure the facewidth B as wide as possible and to keep $L_3$ short, $L_{62}$ and $L_{63}$ need to be minimized.

The separating wall 62 is obviously a wall supporting the whole spindle outer tube 20 so as to prevent the outer-tube gear portion 50 from being distorted into an oval shape by rolling torque while the oval hole 60 is deformed into an elliptical shape by the rolling torque, and the thickness $L_{62}$ therefore needs to be more than a certain thickness. Moreover, the gear spindle 3 of this embodiment is configured to generate large torque and rotate at high speed, and heat generation in its tooth portion is accordingly large. However, since the spindle 3 has a small diameter, the inner diameter of the lubricating oil chamber 63 for sealing the lubricating oil therein is small. Thus, a certain length $L_{63}$ is necessary to secure the amount of the lubricating oil inside the lubricating oil chamber 63.

As described above, the facewidth B is an important dimension for the gear spindle to secure its strength but is preferably narrow within that range. In this embodiment, the face width B is such that facewidth $B \leq 250$ [mm].

An upper-lower-roll-axis distance $L_4$ (see FIG. 2) between the work-roll oval portions 70 of the upper and lower work rolls 2 is determined by the minimum usable diameter $D_W$ of the work rolls 2. Since high tensile strength steels have high deformation resistance, the work rolls 2 have a small diameter. For this reason, the upper-lower-roll-axis distance $L_4$ (see FIG. 2) between the work-roll oval portions 70 of the upper and lower work rolls 2 is set to be short.

Moreover, since necessary transmission torque $T_r$ required to rotationally drive the work rolls 2 for rolling a high tensile strength steel being a rolling target strip is large, speed-changing/power-distributing gears of the transmission 4 not shown have a large diameter. For this reason, an upper-lower-output-shaft distance $L_5$ (see FIG. 2) between speed-changing/power-distributing gear shafts 80 of the upper and lower speed-changing/power-distributing gears is set to be long.

As shown in FIG. 2, each gear spindle 3 is installed in such a way as to couple the speed-changing/power-distributing gear shaft 80 of the transmission 4 and the work-roll oval portion 70 of the work roll 2 to each other, and is used with the spindle inner tube 12 inclined at the inclination angel θ with respect to the spindle outer tube 20 and the work-roll oval portion 70.

Meanwhile, the upper-lower-output-shaft distance $L_5$ (FIG. 2) of the transmission 4, which is one of the causes of this inclination angle θ, is determined by the necessary transmission torque $T_r$ and other conditions and varies from one line to another. Moreover, the upper-lower-roll-axis distance $L_4$ between the work-roll oval portions 70 of the upper and lower work rolls 2 changes depending on rolling conditions such as the set thickness of the rolling target strip, the wear of the work rolls 2 with use, the polishing of the work rolls 2, and so on.

Thus, the inclination angle θ of each gear spindle 3 varies depending on the specifications of the line and changes with use. With these facts taken into consideration, a certain range of inclination angles θ needs to be tolerated for the gear spindle 3. In this embodiment, the inclination angle θ between the spindle inner tube 12 and the spindle outer tube 20 is such that 0.6°≤θ≤1.6°.

The allowable transmission torque $T_a$ of the gear spindle 3 at the inclination angle θ is transmitted not by all the teeth of the inner-tube gear portion 40 and the outer-tube gear portion 50 constantly contacting each other but by some of the teeth of the inner-tube gear portion 40 and the outer-tube gear portion 50 contacting each other at given moments. The larger the inclination angle θ, the smaller the number of teeth contributing to the transmission of transmission torque T at she given moments.

In the case of the gear spindle for high tensile strength steel rolling in this embodiment, the necessary transmission torque $T_r$ is extremely large, and the load needs to be divided by using as many teeth as possible. For this reason, the inclination angle θ is preferably small. However, in a case of a high tensile strength steel rolling mill, the roll diameter is smaller than normal ones since the rolling load is limited, while the size of the transmission is large for large torque transmission. As a result of these factors combined, the difference ($L_5$–$L_4$) between the upper-lower-output-shaft distance $L_5$, which is the height of the axes of the transmission, and the upper-lower-roll-axis distance $L_4$, which is the height of the axes of the rolls, tends to be large. Further, since small-diameter work rolls are rotated at high speed to increase the productivity, the length $L_1$ of the spindles 3 needs to be as short as possible. Due to these two reasons, the inclination angle θ of each gear spindle 3 in the rolling mill 1 expressed as tan θ≈($L_5$–$L_4$)/$L_1$ must be large to some extent.

In recent years, in view of these circumstances, techniques to reduce the upper-lower-output-shaft distance $L_5$ of the transmission 4 like the previously-described driving unit (Patent Document) for a rolling line have been developed. As a result, the inclination, angle θ can now be set such that θ≤1.6°, as a use condition for gear spindles for high tensile strength steel rolling. 0.6° should be plausible as the lower limit of the inclination angle θ even in consideration of the fact that the specifications of the transmission vary from one line to another and that the roll diameter changes with use. Thus, 0.6°≤θ≤1.6° is plausible as the range of the inclination angle θ of gear spindles for high tensile strength steel rolling.

Figure 3:
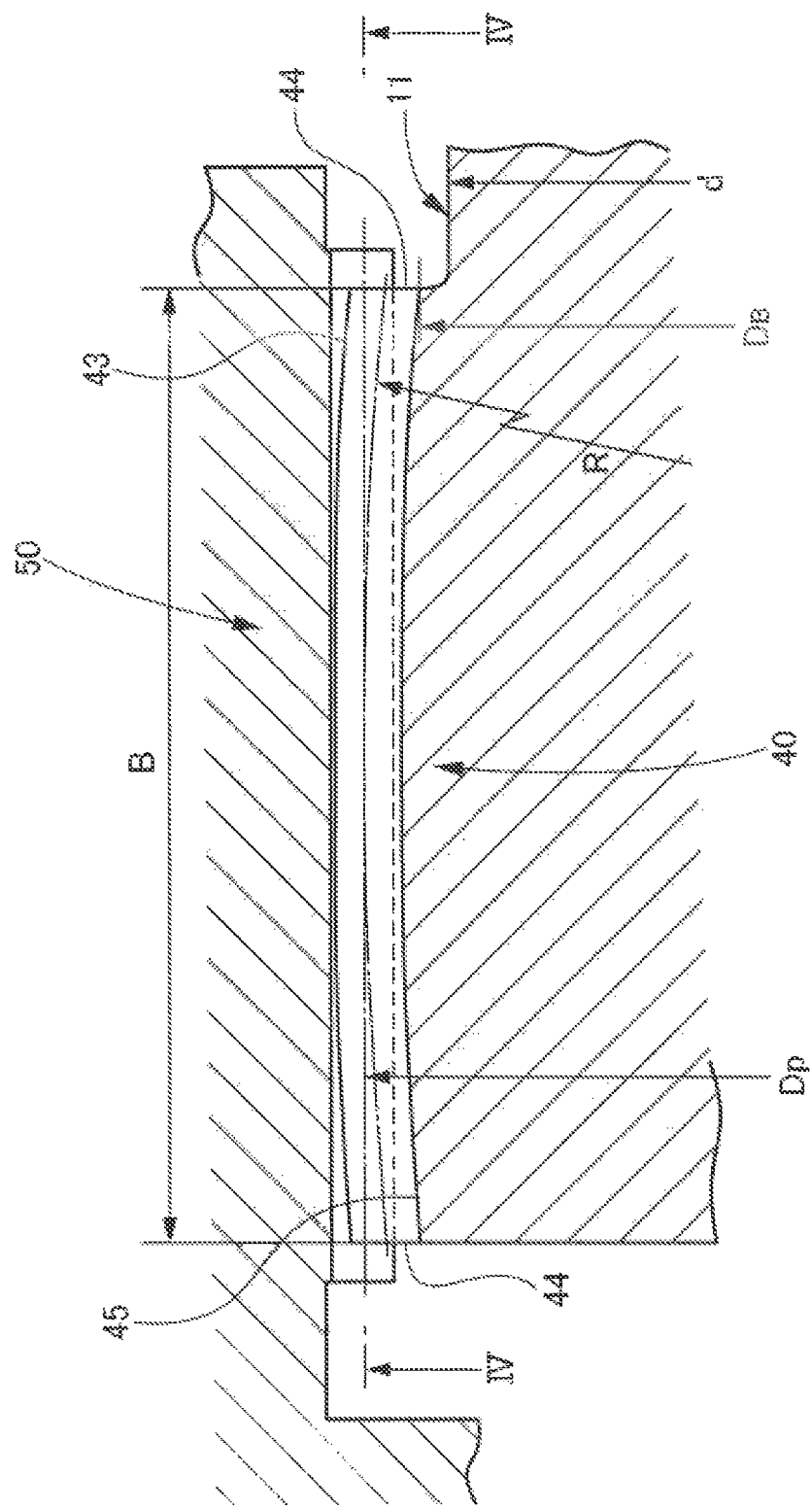
FIG. 3 is a longitudinal cross-sectional view showing fitting portions of an inner-tube gear portion and an outer-tube gear portion in the gear spindle according to Embodiment 1 of the present invention.
Figure 4:
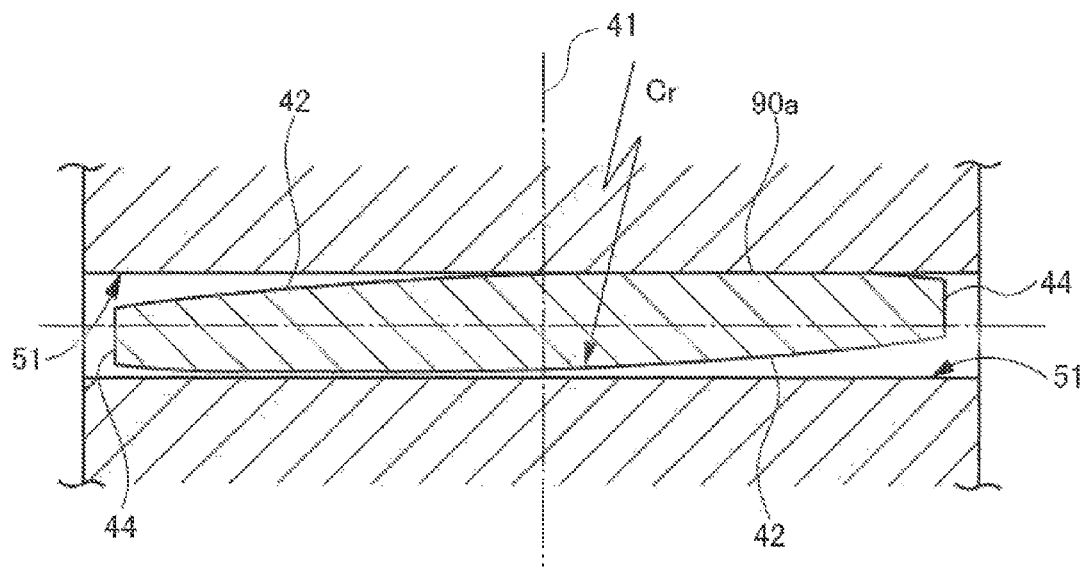
FIG. 4 is a longitudinal cross-sectional view showing the fitting portions of the inner-tube gear portion and the outer-tube gear portion in the gear spindle according to Embodiment 1 of the present invention (a cross section taken along line IV-IV in FIG. 3 and seen in the direction of arrows IV in FIG. 3).

As shown in FIG. 3, the shape of each tooth tip 43 of the inner-tube gear portion 40 is set to an arc shape curving along the facewidth direction such that she pitch circle has a radius of curvature R, so as to tolerate the inclination angle θ between the spindle inner tube 12 and the spindle outer tube 20. Moreover, as shown in FIG. 4, each tooth of the inner-tube gear portion 40 is provided with a crown of the radius of curvature Cr such that the tooth is thicker at the center and thinner at tooth ends 44 along the facewidth direction, so as to avoid edge contact between the tooth surface of the inner-tube gear portion 40 at the tooth end 44 and a tooth surface 51 of the outer-tube gear portion 50. The relationship between the tooth tip radius R and the crown radius Cr is as follows.

$$R = Cr \times \tan \alpha \text{ [mm]} \tag{1}$$

Here, α is the pressure angle of the inner-tube gear portion 40 and is set in this embodiment such that the pressure angle α=25°.

Moreover, in this embodiment, a module Mn indicative of the size of each tooth of the inner-tube gear portion 40 and the outer-tube gear portion 50 is such that the module Mn=5 [mm] to 10 [mm].

In addition to the settings described above, a description will be given below of the settings of the crown radius Cr and the facewidth B of the inner-tube gear portion 40 in the gear spindle 3 included in the rolling mill 1 of this embodiment.

As shown in FIG. 4, by providing the crown to each tooth Of the inner-tube gear portion 40, a tooth surface 42 of the inner-tube gear portion 40 contacts the tooth surface 51 of the outer-tube gear portion 50 in an elastically deformed manner, instead of partially contacting the tooth surface 51 at either tooth end portion 44. Meanwhile, while the gear spindle 3 is rotated, the inner-tube gear portion 40 and the outer-tube gear portion 50 are not in contact always at the same spot but are in contact while the contacting spot is moving. In other words, the position of the contacting portions of the inner-tube gear portion 40 and the outer-tube gear portion 50 changes from one moment to another.

Figure 5A:
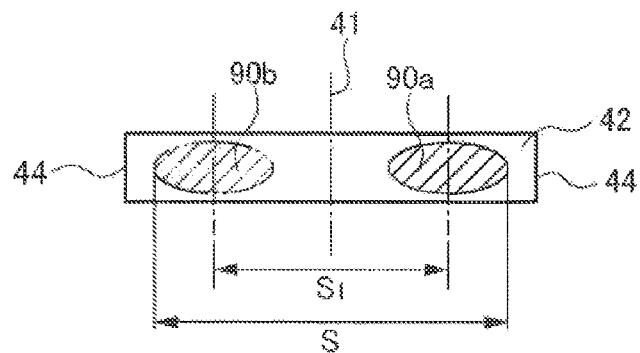
FIG. 5A is an explanatory diagram showing contacting portions of the inner-tube gear portion and the outer-tube gear portion in the gear spindle according to Embodiment 1 of the present invention in a case where the crown radius is small and the facewidth is narrow.
Figure 5B:
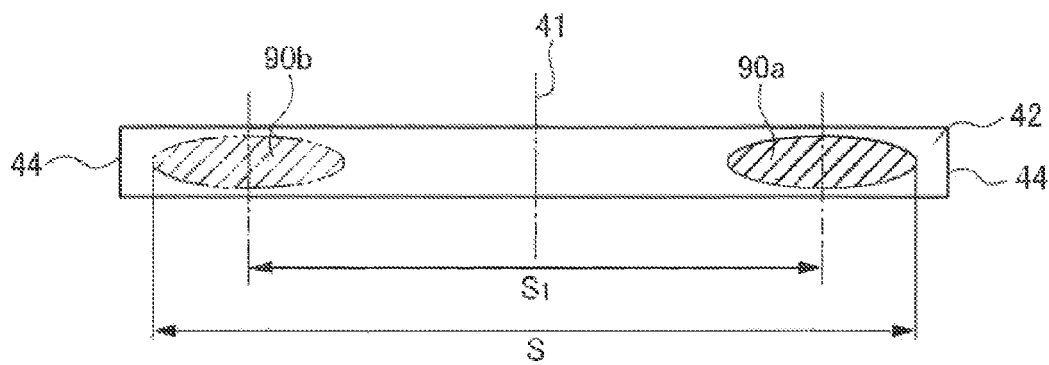
FIG. 5B is an explanatory diagram, showing the contacting portions of the inner-tube gear portion and the outer-tube gear portion in the gear spindle according to Embodiment 1 of the present invention in a case where the crown radius is large and the facewidth is wide.

As shown in FIGS. 5A and 5B, the inner-tube gear portion 40 and the outer-tube gear portion 50 contact each other while moving their contacting portions between a contacting spot 90a at which the contacting portions get closest to one end at one moment (hereinafter, the farthest contacting spot 90a) and a contacting spot 90b at which the contacting portions get closest to the other end at another moment (hereinafter, the farthest contacting spot 90b), back and torch one time per rotation. Note that as the contacting portions of the inner-tube gear portion 40 and the outer-tube gear portion 50 get close to the facewidth center 41, the tooth surface 42 of the inner-tube gear portion 40 and the tooth surface 51 of the outer-tube gear portion 50 may be separated out of contact with each other in some cases.

As shown in FIG. 5A, in a case where the crown radius Cr is small, the distance $S_1$ between the farthest contacting spots 90a and 90b is short, and the range within which the tooth surface 42 of the inner-tube gear portion 40 and the tooth surface 51 of the outer-tube gear portion 50 can contact each other (hereinafter, the contacting range S) is narrow. Moreover, the area of the contacting spot at each moment (90a in FIG. 5A) is small, and therefore surface pressure P at the contacting spot at each moment is large.

In contrast, as shown in FIG. 5B, in a case where the crown radius Cr is large, the distance $S_1$ between the farthest contacting spots 90a and 90b is long, and the contact range S is wide. Moreover, the area of the contacting spot at each moment (90a in FIG. 5B) is large, and therefore the surface pressure P at the contacting spot at each moment is small.

In summary, when the crown radius Cr is set to be small, the contacting range S becomes narrow and the facewidth B can therefore be set to be small. When the crown radius Cr is set to be large, the contacting range S becomes wide and the facewidth B must therefore be set to be large. If the inner-tube gear portion 40 is such that the facewidth B is set to be small while the crown radius Cr is large, each tooth end 44 will be within the contacting range S. This leads to edge contact at the tooth end 44 and possible tooth fracture. For this reason, a minimum necessary facewidth B is set with respect to the crown radius Cr (this facewidth will foe denoted by $B_1$) based on the following formula (2) so that the contacting range S will not cover either tooth end 44.

$$B_1 = 0.0272 \times Cr + 28 \text{ [mm]} \tag{2}$$

Figure 6:
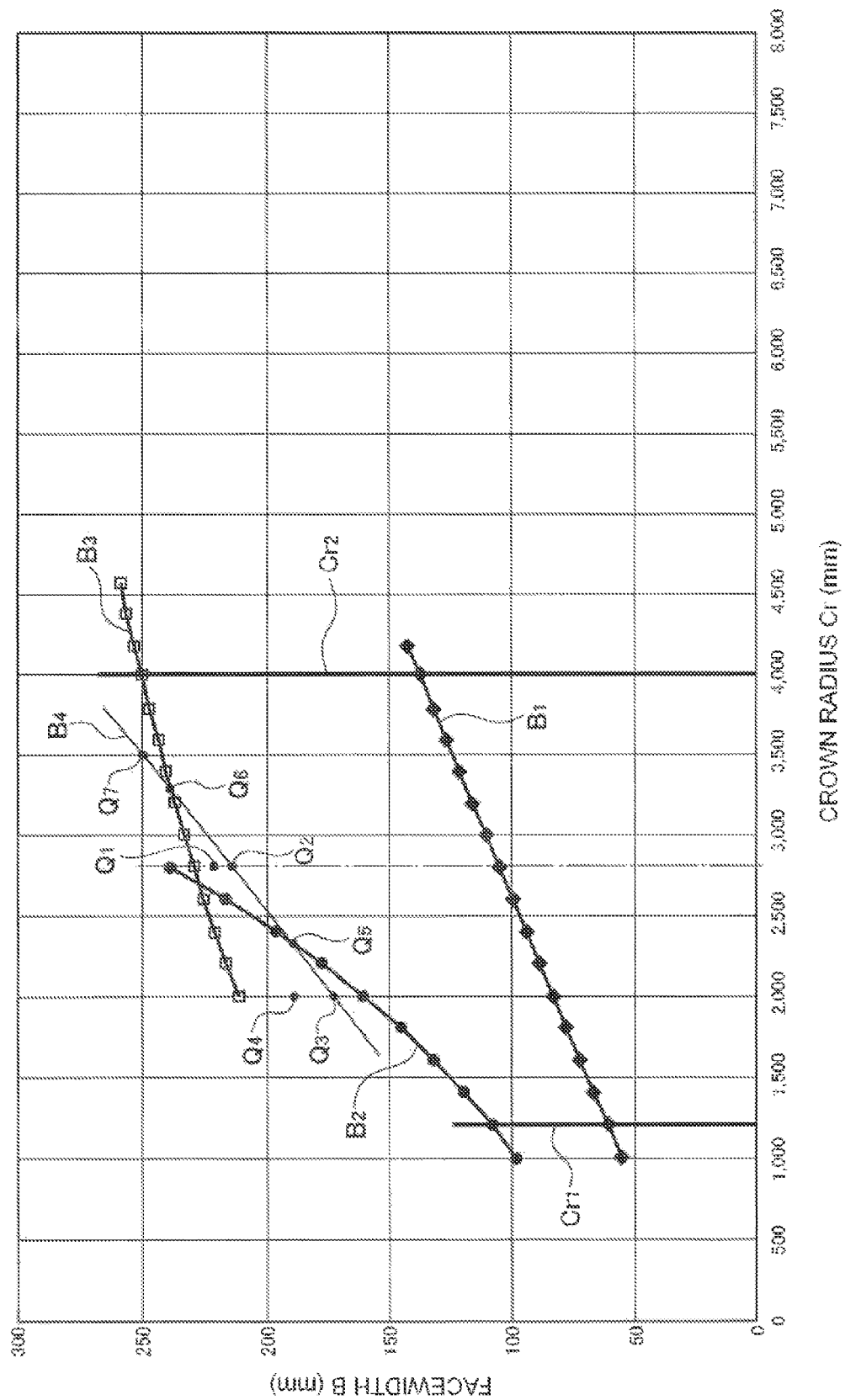
FIG. 6 is a graph showing a range within which to set the crown radius and the facewidth in the gear spindle according to Embodiment 1 of the present invention.

As shown in FIG. 6, this formula (2), though varying depending on the inclination angle θ and other parameters, is a formula representing approximation of minimum necessary facewidths B with which edge contact will not occur at either tooth end 44, plotted with respect to crown radii Cr under assumption of the range of the numerical value setting mentioned above (the inclination angle θ=0.6° to 1.6°) (this formula corresponds to a case assuming the inclination angle θ=0.6° as the numeral value setting of the gear spindle 3).

If the facewidth B with respect to the crown radius Cr is set to be smaller than the formula (2), edge contact occurs at the tooth ends 44 and teeth may possibly be fractured. Thus, the facewidth B with respect to the crown radius Cr is set to be larger than the formula (2) so as to eliminate the possibility of tooth fracture due to edge contact at the tooth ends 44. In other words, the facewidth B with respect to the crown radius Cr is set such that B≥0.0272×Cr+28 [mm].

Increasing the crown radius Cr stretches and lengthens the shape of the contacting spot 90a in the facewidth direction, and also widens an effective face-width Bh at the tooth root serving as a force path through which force applied to the contacting spot 90a is transmitted from the tooth surface 42 to a bottom land 45 and then to other parts. Accordingly, the tooth-root bending stress σ decreases.

Meanwhile, due to the structural nature, the tooth root of the outer-tube gear portion 50 which is a set of internal teeth is thicker than the tooth root of the inner-tube gear portion 40 which is a set of outer teeth, and the outer-tube gear portion 50 is therefore stronger than the inner-tube gear portion 40. For this reason, the strength of the less strong inner-tube gear portion 40 is used as the tooth-root bending strength of the gear spindle.

In this embodiment, allowable tooth-root bending stress $\sigma_a$ as an allowable value with which fracture of teeth of the inner-tube gear portion 40 and the outer-tube gear portion 50 will riot occur is set such that $\sigma_a$=39 [kg/mm], and a facewidth B with which the allowable tooth-root bending stress $\sigma_a$ (this facewidth will be denoted by $B_2$) is obtained is set with respect to the crown radius Cr based on the following formula (3).

$$B_2 = 59.04 \times \exp(0.0005 \times Cr) \text{ [mm]} \quad (3)$$

As shown in FIG. 6, this formula (3) is a formula representing approximation of a plot of crown radii Cr with which the tooth-root bending stress σ is σ=39 [kg/mm$^2$] versus facewidths B with which edge contact will not occur at either tooth end 44 under these conditions, when a given inclination angle θ is set within the range of the numerical value setting mentioned above.

Major parameters that determine the tooth-root bending stress σ are the torque T, the inclination angle θ, the gear-spindle outer diameter D, and the effective facewidth Bh, and the following formula (4) is assumed.

$$\sigma \propto T \times f(\theta)/(D^2 \times Bh) \quad (4)$$

Here, Bh is the effective facewidth Bh=f (Cr, T) and is dependent on the crown radius Cr and the load torque T.

When a given inclination angle θ determined by external factors is provided, the allowable minimum crown radius Cr with which the tooth-root bending stress σ is maintained at or below the allowable value $\sigma_a$ is determined from the formula (4). In addition, the minimum facewidth B suitable for the allowable minimum crown radius Cr is determined from the formula (3). Here, if the crown radius Cr is set to a value equal to or smaller than the minimum necessary value, setting the facewidth B to a value larger than the suitable value for compensation has no effect on the strength; the tooth-root bending stress o still exceeds the allowable value $\sigma_a$, hence causing a possibility of tooth fracture.

When the inclination angle θ is given, the allowable minimum crown radius Cr and the minimum facewidth B can be obtained by selecting a combination of a crown radius Cr and a facewidth B based on the condition of the formula (3). Thus, the crown radius Cr is set to or above the allowable minimum value, and the facewidth B is set to the minimum value with which edge contact will not occur under the condition where that crown radius Cr is given. This can be mathematically expressed by the following formula.

$$B \le 59.04 \times \exp(0.0005 \times Cr) \text{ [mm]}$$

Note that the formula (3) is a calculation based on a setting where the minimum facewidth B with which tooth fracture due to edge contact at the tooth ends 44 will not occur takes into consideration the maximum unexpected load during operation and the like (a setting where 20 [mm] is secured from each tooth end 44 in the minimum facewidth B).

Moreover, the surface pressure P at the contacting spot between the inner-tube gear portion 40 and the outer-tube gear portion 50 greatly influences seizure at the tooth surface 42 of the inner-tube gear portion 40 and the tooth surface 51 of the outer-tube gear portion 50. The larger the surface pressure P, the higher the possibility of seizure, and the smaller the surface pressure P, the lower the possibility of seizure. By increasing the crown radius Cr, the surface pressure P at the contacting spot is decreased as mentioned earlier. Accordingly, the possibility of seizure at the tooth surface 42 of the inner-tube gear portion 40 and the tooth surface 51 of the outer-tube gear portion 50 can be reduced.

Note that the crown radius Cr mast be above a certain value in order to achieve high transmission torque capacity required for gear spindles for ultra-high tensile strength steel rolling, specifically, T/D$^3$≤0.8 to 1.0 [ton/m$^2$]. Hence, as shown in FIG. 6, a minimum crown radius $Cr_1$ as a lower limit value is set such that $Cr_1$=1200 [mm].

If the crown radius Cr is set to be smaller than the minimum crown radius $Cr_1$, the gear spindle 3 will only be able to handle cases where the inclination angle θ is small and the necessary transmission torque $T_r$ is small. Thus, the crown radius Cr is set to be larger than $Cr_1$ so that the gear spindle 3 will also be able to handle cases where the inclination angle θ is large and cases where the necessary transmission torque $T_r$ is large. In other words, the crown radius Cr is set such that Cr≥1200 [mm].

The gear spindle 3 rotates by having the inner-tube gear portion 40 and the outer-tube gear portion 50 in mesh with each other. For the gear spindle 3 at an inclination angle θ of 0.6° to 1.6° to smoothly rotate without any interference between the teeth on both sides, the crown is provided, and also a backlash being a gap between teeth is provided. An extremely large backlash amount BL leads to a large play between teeth and causes vibration.

In this embodiment, an allowable value dependent on the module Mn is set based on the following formula (4) as an allowable maximum backlash amount BL with which no harmful vibration occurs. Note that backlash change due to machining errors and deterioration with time are not taken into consideration here for the sake of simple explanation.

$$BL \le (1 + 0.1 \times Mn) \text{ [mm]} \quad (5)$$

Moreover, since the numerical value setting mentioned above is such that the inclination angle θ=0.6° to 1.6°, the backlash amount BL required for smooth rotation is also dependent on the inclination angle θ of the gear spindle 3 and the crown radius Cr. A large backlash amount BL is required when the inclination angle θ is large, and a large backlash amount BL is required also when the crown radius Cr is large. Moreover, when the crown radius Cr is large, the necessary facewidth B is also large. Hence, a facewidth B with which the backlash amount BL can be the allowable value by the formula (5) (this facewidth will be denoted by $B_3$) is set with respect to the crown radius Cr based on the following formula (6).

$$B_3 = 32 \times Cr^{0.247} \text{ [mm]} \qquad (6)$$

As shown in FIG. 6, this formula (6) is a formula representing approximation of a plot of crown radii Cr with which the backlash amount BL can be the allowable value by the formula (5) versus facewidths B with which edge contact will not occur at either tooth end under these conditions, when a given inclination angle θ is set within the range of the numerical value setting mentioned above.

Note that the formula (6) is a calculation based on the setting where the minimum facewidth b with which tooth fracture due to edge contact at the tooth ends 44 will not occur takes into consideration the maximum unexpected load during operation and the like (the setting where 20 [mm] is secured from each tooth end 44 in the minimum facewidth B).

When a given inclination angle θ determined by external factors is provided, increasing the crown radius Cr increased the facewidth B necessary for preventing edge contact and also increases the backlash amount BL.

When the inclination angle θ is given, the allowable maximum crown radius Cr and the minimum facewidth B can be obtained by selecting a combination of a crown radius Cr and a facewidth B based on the condition of the formula (6). Thus, the crown radius Cr is set to or below the allowable maximum value, and the facewidth B is set to the minimum value with which edge contact will not occur under the condition where that crown radius Cr is given. This can be mathematically expressed by the following formula.

$$B \leq 32 \times Cr^{0.247} \text{ [mm]}$$

Next, disadvantages of increasing the crown radius Cr will be described.

The tooth tip 43 of the inner-tube gear portion 40 has an arc shape along the facewidth direction. Thus, the size of the root, circle at the bottom 45 (hereinafter, the root circle diameter $D_S$) changes along the facewidth direction in such a way as to become smaller from the facewidth center 41 toward the tooth ends 44. Since the tooth tip radius R and the crown radius Cr have the relationship of the formula (1) mentioned earlier, the tooth tip radius R is small when the crown radius Cr is small, and the tooth tip radius R is large when the crown radius Cr is large. Thus, with the same facewidth B, increasing the crown radius Cr increases the tooth tip radius R and therefore increases the root diameter Ds at the tooth ends 44.

Meanwhile, to increase the crown radius Cr, the facewidth B needs to he increased so as to secure a facewidth B with which edge contact will not occur at either tooth end 44 as mentioned earlier. Thus, with the same crown radius Cr and the same tooth tip radius R, increasing the facewidth E decreases the root diameter $D_B$ at the tooth ends 44.

As described above, increasing the crown radius Cr results in a factor that increases the root diameter $D_B$ and a factor that decreases the root diameter $D_B$, but eventually decreases the root diameter $D_B$. Meanwhile, a neck diameter d of a neck portion 11 of the spindle inner tube 12 needs to be smaller than the root diameter $D_B$ due to manufacturing and machining constraints. In other others, when increasing the crown radius Cr decreases the neck diameter d of the neck portion 11 and thereby increases torsional stress in the neck portion 11.

Another disadvantage is increase in bending stress in the neck portion 11 of the spindle inner tube 12.

Specifically, rotational force F applied to the tooth surface 42 of the inner-tube gear portion 40 of the spindle 3 by spindle rotation torque is constant regardless of the size of the crown radius Cr. However, the inner-tube gear portion 40 includes many teeth, and as shown in FIGS. 5A and 5B, a tooth on the opposite side by approximately 180° of a tooth receiving the rotational force F at the farthest contacting spot 90a, receives the rotational force F at the farthest contacting spot 90b. Thus, the rotational force F is applied to the neck portion 11 of the spindle inner tube 12 as a bending moment.

Here, the distance $S_1$ between the farthest contacting spots 90a and 90b is the length at the bending moment, and the distance $S_1$ between the farthest contacting spots 90a and 90b is longer when the crown radius Cr is large than when the crown radius Cr is small. Thus, assuming that the bending moment is M, $M \approx F \times S_1$ is applied to the neck portion 11 of the spindle inner tube 12. In order words, increasing the crown radius Cr increases the bending moment M in the neck portion 11 and thereby increases the bending stress in the neck portion 11.

According to the two points described above, excessively increasing the crown radius Cr increases the combination of the bending stress and the torsional stress in the neck portion 11 and lowers the strength of the spindle 3. To prevent this, a maximum crown radius $Cr_2$ as an upper limit value is set such that $Cr_2 = 4000$ [mm] as shown in FIG. 6.

If the crown radius Cr is set to be larger than the maximum crown radius $Cr_2$, both she torsional stress and the bending stress in the neck portion 11 increase, and the neck portion 11 of the spindle inner tube 12 may possibly break. Thus, the crown radius Cr is set to be smaller than the maximum crown radius $Cr_2$ to eliminate the possibility of the breakage of the neck portion 11 due to excessive stress caused by the combination of the torsional stress and the bending stress in the neck portion 11. In other words, the crown radius Cr is set such that $Cr \leq 4000$ [mm].

Then, the gear spindle 3 whose crown radius Cr and facewidth B are set as described above is further subjected to the following treatment and its shape is specified as well. As a result, the possibility of seizure at the tooth surface 42 of the inner-tube gear portion 40 and the tooth surface 51 of the outer-tube gear portion 50 is reduced, and the strength of the spindle inner tubs 12 is increased. Accordingly, the gear spindle 3 becomes capable of stably transmitting large transmission torque T.

In a case where the necessary transmission torque $T_r$ to the gear spindle 3 of this embodiment is large, the surface pressure P applied to the tooth surface 42 of the inner-tube gear portion 40 and the tooth surface 51 of the outer-tube gear portion 50 is large, and the amounts of heat at the tooth surfaces 42 and 51 are high. Moreover, since the diameter of the gear spindle 3 is reduced due to the reduced diameter of the work roll 2, the amount of lubricating oil scalable between in the inner-tube gear portion 40 and the outer-tube gear portion 50 of the gear spindle 3 is small. Thus, to further reduce the possibility of seizure of the tooth surface 42 of the inner-tube gear portion 40 and the tooth surface 51 of the outer-tube gear portion 50, it is preferable to perform treatment effective in reducing temperature increase due to frictional heat.

A cause of seizure of the tooth surfaces 42 and 51 is heat generation due to metal contact between the tooth surfaces 42 and 51 along with oil film shortage, and insufficient cooling of the generated heat. Solutions to this heat generation include reducing the surface pressure P, lowering slipping speed V, enhancing the oil-film maintaining performance, setting solid lubricant, and the like. Solutions to the cooling power include employing external forced cooling and the like. Providing the above-described crown is expected to be effective for the reduction of the surface pressure P. The lowering of the slipping speed V is dependent on rolling conditions such as the rolling speed and the inclination angle, and therefore the degree of freedom in setting the degree of reduction is low. Thus, the generation of frictional heat in the inner-tube gear portion 40 and the outer-tube gear portion 50 is suppressed by enhancing the oil-film maintaining performance and setting solid lubricant while the cooling of the spindle inner tube 12 and the spindle outer tube 20 is accelerated by employing external forced cooling to thereby suppress the temperature increase in the tooth surfaces 42 and 51.

First, shot blasting is performed on the tooth surfaces 42 and 51 of the inner-tube gear portion 40 and outer-tube gear portion 50. The shot blasting creates fine dimples in the tooth surfaces 42 and 51. By maintaining oil in the dimples, an effect of preventing oil film shortage is achieved.

Then, manganese phosphate coating treatment is performed on the tooth surfaces 42 and 51 of the inner-tube gear portion 40 and outer-tube gear portion 50. A manganese phosphate film is porous crystals. Thus, the film has an oil retaining ability and also has good initial conformability, Accordingly, an effect of reducing the generation of frictional heat is achieved.

Then, molybdenum disulfide baking is performed on the tooth surfaces 42 and 51 of the inner-tube gear portion 40 and outer-tube gear portion 50. By the molybdenum disulfide baking, solid lubricant is baked on the tooth surfaces 42 and 51. Thus, an effect of preventing metal contact in case of oil shortage by means of the solid lubricant is achieved.

Next, cooling fluids are sprayed onto the spindle outer tube 20 on the work roll 2 side and the spindle outer tube 30 on the transmission 4 side so as to forcibly cool the lubricating oil on the tooth surfaces of the spindle outer tubes 20 and 30 and the spindle inner tubes 12 and 13 and the lubricating oil between the tooth surfaces.

The lubricating oil chamber 63 provided between the inner-tube gear portion 40 and the outer-tube gear portion 50 is isolated from the outside by a seal member 64, and high-viscosity lubricating oil is sealed in it. Note that as the temperature of the lubricating oil increases, its viscosity decreases and the likelihood of oil film shortage on the inner-tube gear portion 40 and the outer-tube gear portion 50 increases. Moreover, as the gear spindle 3 is used at high temperature for a long period of time, the lubricating oil deteriorates and the lubricity decreases accordingly. Hence, the external forced cooling of the gear spindle 3 is significantly effective in preventing she oil film shortage and preventing the lubricating oil deterioration.

As cooling fluids, a rolling roll coolant, a transmission lubrication gear oil, and the like are available. Both fluids have enough cooling performance, but their oil film strength is significantly lower than the high-viscosity lubricating oil used for the gear spindle 3. Thus, they are not suitable as the lubricating oil for the tooth surfaces of the inner-tube gear portion 40 and outer-tube gear portion 50. Accordingly, as mentioned above, the lubricating oil chamber 63 is isolated from the outside by the seal member 64 to prevent the cooling fluids from flowing into the lubricating oil chamber 63 and to prevent the lubricating oil from flowing out therefrom.

The rolling roll coolant is sprayed in large quantity near the work roll 2 for the purpose of lowering the coefficient of friction between the rolling target strip and the work roll 2 and cooling the work roll 2. Moreover, the transmission lubrication gear oil is sprayed in large quantity to the inside of the transmission 4 for the purpose of lowering the coefficients of friction between she gears and bearings in the transmission 4 and cooling them. Thus, it is relatively easy to employ these fluids for the cooling of the gear spindle 3, and a large effect can be expected as well.

The most fragile part of the gear spindle is the inner-tube gear portion. Thus, as mentioned earlier, the crown radius Cr and the facewidth B of the Inner-tube gear portion 40 are optimally set to improve the strength of the inner-tube gear portion 40 and thereby improve the allowable transmission torque $T_a$ of the gear spindle 3.

However, as the present invention improves the strength of the inner-tube gear portion 40, the inner-tube gear portion 40 may no longer be the most fragile part of the gear spindle 3. Specifically, even when the strength of the inner-tube gear portion 40 is improved, the allowable transmission torque $T_a$ of the gear spindle 3 cannot be increased sufficiently if other parts of the inner-tube gear portion 40 do not have sufficient strength. For this reason, it is essential to improve the strength of the whole structure including these other parts in order to improve the allowable transmission torque $T_a$ of the gear spindle 3.

The strength of the gear spindle 3 excluding the inner-tube gear portion 40 is dependent on the neck diameter d of the neck portion 11 which has the smallest outer diameter within the gear spindle 3. The larger the neck diameter d, the larger the allowable transmission torque $T_a$, and the smaller the neck diameter d, the smaller the allowable transmission torque $T_a$.

The neck diameter a of the neck portion 11 of the spindle inner tube 12 needs to be smaller than the root diameter $D_B$ due to manufacturing and machining constraints. To increase the neck diameter d to eliminate the possibility of breakage at the neck portion 11, it is effective to minimize the difference between the root diameter $D_B$ and the neck diameter d within a range which does not affect the manufacturing and machining. In this embodiment, the lower limit value of the neck diameter d of the gear spindle 3 which does not affect the machining such as the crowning is set based on the following formula (7).

[Formula 2]

$$d \geq D_P - 2 \times \left[ R - \left\{ R^2 - \left(\frac{B}{2}\right)^2 \right\}^{\frac{1}{2}} + (Mn + 5) \right] [\text{mm}] \quad (7)$$

A conventional gear spindle (e.g. Patent Document 1) is such that neck diameter/pitch circle diameter=$d/D_P \approx 0.78$. The gear spindle 3 of this embodiment is such that neck diameter/pitch circle diameter=$d/D_P \approx 0.89$ by setting the neck diameter d to the lower limit value in the formula (7). The torsional strength and the bending strength are proportional to the cube of the diameter. Hence, the strength of the gear spindle 3 of this embodiment relative to the strength of the conventional gear spindle is expressed as $(0.89)^3/(0.78)^3 = 1.49 \approx 150\%$.

In other words, the torsional strength at the neck portion 11 can be improved by approximately 150% as compared to she conventional case by setting the neck diameter d of the gear spindle 3 within the range of the formula (7).

Note that carburizing and quenching treatment is preformed on the spindle inner tube 12 of the gear spindle 3 of this embodiment at a portion having the neck diameter d so as to improve the mechanical strength of the neck portion 11. The carburizing treatment improves the strength by approximately 150% as compared to tempering treatment which is standard heat treatment. By the combination of the carburizing treatment and shape specification based the formula (7) for the neck diameter d mentioned above, the torsional strength and the bending strength at the neck portion 11 are 150%×150%=225% and can therefore be improved to be more than twice larger than the conventional case.

Next, the setting and effects of the crown radius Cr and the facewidth B of the gear spindle 3 will be described in detail through a specific example. Note that the module Mn=10 [mm] and the inclination angle θ=1.2° will be assumed as a numeral value setting A.

In the numeral value setting A, the facewidth B with which edge contact will not occur at either tooth end 44 with respect to the crown radius Cr is a facewidth $B_4$ (FIG. 6). If the facewidth B with respect to the crown radius Cr is set below the $B_4$ line, there will be a possibility of tooth fracture due to edge contact at the tooth ends 44. Thus, the facewidth B with respect to the crown radius Cr is set on or above the $B_4$ line (the $B_4$ line or an area above the $B_4$ line in FIG. 6).

Settings at a point $Q_1$ and a point $Q_2$ at each of which the facewidth B with respect to the crown radius Cr is on or above the $B_4$ line are compared. As compared to the point $Q_2$ on the $B_4$ line, the point $Q_1$ is a setting in which the facewidth B is widened, while the same crown radius Cr is maintained. In the settings at the point $Q_1$ and the point $Q_2$, the crown radius Cr is set to the same value, and the effective facewidth Bh=f(Cr, T) is therefore the same as well. Accordingly, in the setting at the point $Q_1$, as compared to the setting at the point $Q_2$, the tooth root bending strength is not improved, and since the neck diameter d is narrowed in proportion so the amount by which the facewidth B is widened, the strength is decreased. In other words, setting the facewidth B above the $B_4$ line does not have any effect on the tooth root bending strength. Thus, it is preferable for the gear spindle 3 to have its facewidth B set on the $B_4$ line, which is the minimum necessary setting, in view of the decrease in the strength of the neck portion 11, the manufacturing cost, and the like.

Next, the facewidth B wish which the allowable tooth-root bending stress σ=39 [kg/mm²] is obtained with respect to the crown radius Cr is the facewidth $B_2$. The tooth root strength is insufficient in the case of a setting at a point $Q_3$ on the $B_4$ line at which the crown radius Cr is below the $B_2$ line. Then, the facewidth B may be increased to obtain a setting of a point $Q_4$ so as to compensate the insufficient crown radius, but increasing the facewidth B does not have any effect on the strength; instead, it slightly decreases the neck diameter strength. Thus, at both the point $Q_3$ and the point $Q_4$, the tooth root strength is insufficient and there is a possibility of fracture of teeth of the inner-tube gear portion 40 and the outer-tube gear portion 50. In view of this, the crown radius Cr and the facewidth B with respect thereto are set to a crown radius Cr and a facewidth B larger than those at a point $Q_5$ at which the $B_2$ line and $B_4$ line intersect (the right side of the point $Q_5$ in FIG. 6).

Next, the facewidth B with which the backlash amount BL can be the maximum value (in the numerical value setting A, BL=1+0.1×Mn=2 [mm]) with respect to the crown radius Cr is the facewidth $B_3$. The crown radius Cr and the facewidth B with respect thereto are set to a crown radius Cr and a facewidth B smaller than those at a point $Q_6$ at which the $B_3$ line and $B_4$ line intersect (the left side of the point $Q_6$ in FIG. 6). If the crown radius Cr and the facewidth B with respect thereto are set above the $B_3$ line (e.g. a point $Q_7$), the backlash amount BL becomes excessively large and the vibration of the gear spindle 3 increases, which in turn leads to possible deterioration in rolling performance such as variation in the thickness of the rolling target strip and deterioration in the flatness thereof.

By setting the crown radius Cr and the facewidth B on the $B_4$ line between the point $Q_5$ and the point $Q_6$ as described above, the gear spindle 3 becomes able to handle faster rotation and larger transmission torque T than the conventional case, without causing vibration of the gear spindle 3 due to excessive backlash, increase or tooth fracture due to the tooth-root bending stress σ exceeding the allowable tooth-root bending stress $σ_a$.

Note that in the case of a setting in which the crown radius Cr and the facewidth B are near the point $Q_5$ on the $B_4$ line, the BL amount is small, and therefore the rattling is small. Accordingly, the gear spindle 3 can handle faster rotation than Otherwise. Moreover, in the case of a setting in which the crown radius Cr and the facewidth B are near the point $Q_6$ on the $B_4$ line, the crown radius Cr is large, and therefore the surface pressure P is small and the tooth-root bending stress σ is small. Accordingly, the gear spindle 3 can handle larger transmission torque than otherwise. Note that as shown in FIG. 6, any setting on the $B_4$ line between the point $Q_5$ and the point $Q_6$ is a setting in which the crown radius Cr is smaller than the maximum crown radius $Cr_2$. Thus, the gear spindle 3 will not be broken by the combination of the torsional stress and the bending stress in the neck portion 11.

This embodiment has been described by using specific numerical values for the gear-spindle outer diameter D, the strength, index $T/D^3$ of the allowable transmission torque $T_a$, the facewidth B, the inclination angle θ, and the module Mn for the sake of explanation. However, the present invention is not limited to these numerical values. The diameters of the work roll and the gear spindle can be made smaller than the conventional case by utilizing a special feature which is a combination of a crown radius Cr and a facewidth B within a range surrounded by the curved and straight lines $Cr_1$, $B_2$, $B_3$, $Cr_2$, and $B_1$ shown in FIG. 6 to improve the strength of the gear spindle.

Moreover, the present invention has been introduced mainly as a gear spindle suitable for rolling high tensile strength steels. However, the gear spindle and the rolling mill equipped with the same according to this embodiment achieve improved allowable transmission torque performance, and the range of its application is wide. Thus, the gear spindle and the rolling mill equipped with the same according to this embodiment are applicable to the rolling of rolling materials with lower hardness than high tensile strength steels and of rolling materials with relatively high hardness.

Embodiment 2

In this embodiment, the formula (3) for the facewidth $B_2$ and the formula (6) for the facewidth $B_3$, each representing a range within which the facewidth B is set with respect to the crown radius Cr, are calculations based on a setting where the. minimum necessary facewidth B with which tooth fracture due to edge contact at the tooth ends 44 will not occur does not take into consideration the maximum unexpected load during operation and the like (a setting where 20 [mm] is not secured from each tooth end 44 in the minimum necessary facewidth B).

This maximum unexpected load during operation is dependent on the specifications of the rolling target strip, operating conditions, and the like and differs from one case to another. In other words, the facewidth B can be further reduced to the minimum necessary in a case where the maximum unexpected load does not need to be taken into consideration.

Figure 7:
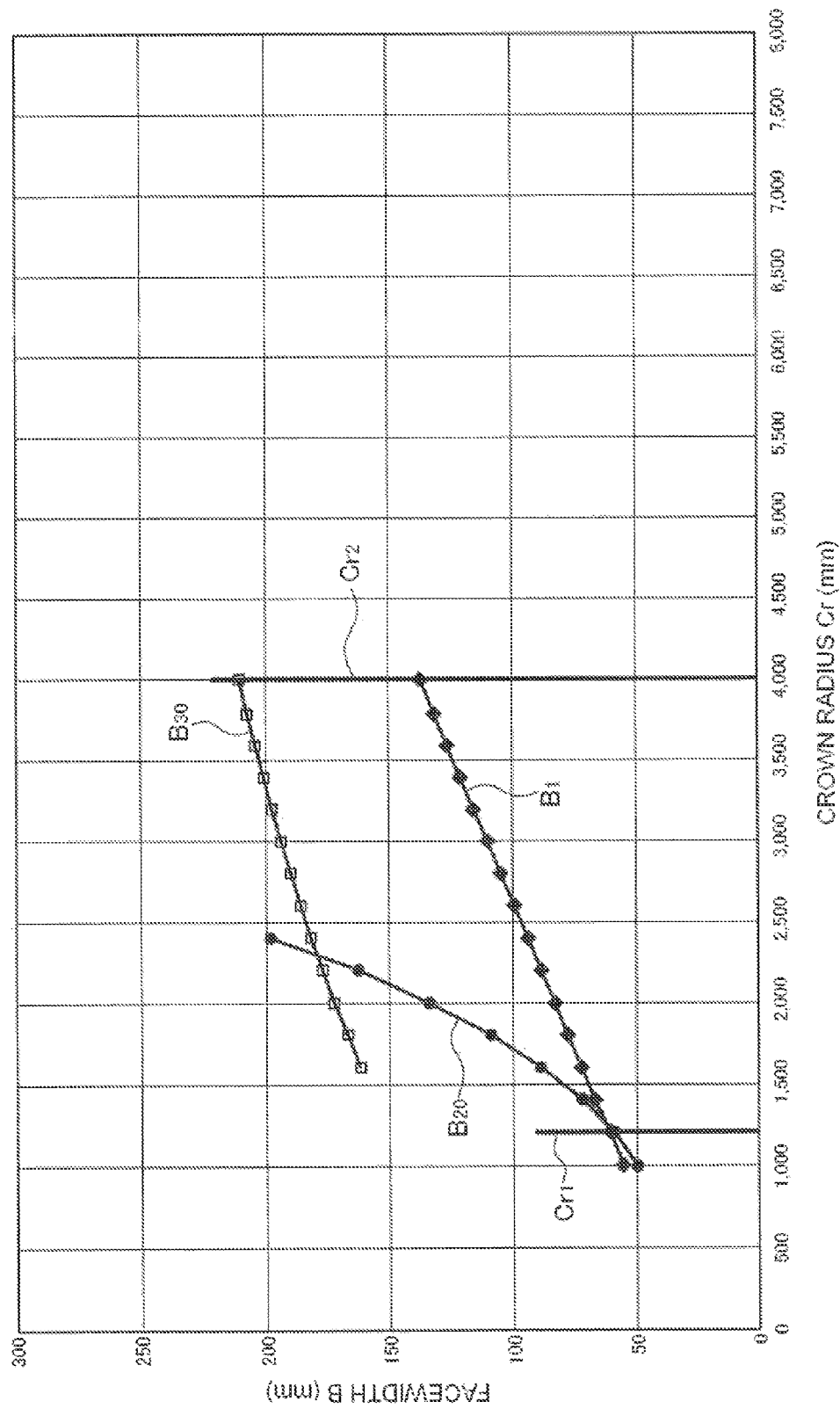
FIG. 7 is a graph showing a range within which to set the crown radius and the minimum necessary facewidth in the gear spindle according to Embodiment 1 of the present invention.

Thus, as shown in FIG. 7, instead of the facewidth $B_2$, a facewidth $B_{20}$ is set based on the following formula (8) as the minimum necessary facewidth B with which tooth fracture due to edge contact at the tooth ends 44 will not occur.

$$B_{20}=18\times\exp(0.001\times Cr)\ [\text{mm}] \quad (8)$$

As shown in FIG. 7, this formula (8) is a formula representing approximation of a plot of crown radii Cr with which the tooth-root bending stress σ is the allowable tooth-root bending stress $\sigma_a$(=39 [kg/mm²]) versus facewidths B with which edge contact will not occur at either tooth end 44 under these conditions, when a given inclination angle θ is set within the range of the numerical value setting mentioned above with the aforementioned condition taken into consideration.

When a given inclination angle θ determined by external factors is provided, the minimum necessary crown radius Cr with which the tooth-root bending stress σ is maintained at or below the allowable tooth-root bending stress $\sigma_a$ is determined from the formula (4). In addition, the minimum facewidth B suitable for the allowable minimum crown radius Cr is also determined from the formula (7). Here, if the crown radius Cr is set to a value equal to or smaller than the minimum necessary value, setting the facewidth B to a value larger than the suitable value for compensation has no effect on the strength; the tooth-root bending stress σ still exceeds the allowable tooth-root bending stress $\sigma_a$, hence causing a possibility of tooth fracture.

When the inclination angle θ is given, the allowable minimum crown radius Cr and the minimum facewidth B can be obtained by selecting a combination of a crown radius Cr and a facewidth B based on the condition of the formula (8). Thus, the crown radius Cr is set to or above the allowable minimum value, and the facewidth B is set to the minimum value with which edge contact will not occur under the condition where that crown radius Cr is given. This can be mathematically expressed by the following formula.

$$B\leq 18\times\exp(0.0001\times Cr)\ [\text{mm}]$$

In other words, the facewidth $B_{20}$ which is narrower than the facewidth $B_2$ by the formula (3) and with which the allowable tooth-root bending stress $\sigma_a$ (=39 [kg/mm²]) is not exceeded can be set without reducing the allowable transmission torque $T_a$ of the teeth.

With the facewidth B being set narrower as described above, the cost, weight, and size can be reduced further. In addition, the center length $L_3$ (FIG. 1) and the entire length $L_1$ (FIG. 2) of the gear spindle 3 are reduced, so that vibration of the gear spindle 3 is less likely to occur.

Moreover, as shown in FIG. 7, instead of the facewidth $B_3$, a facewidth $B_{30}$ is set with respect to the crown radius Cr based on the following formula (9) as the facewidth B with which the backlash amount BL is the allowable value by the formula (5).

$$B_{30}=19\times Cr^{0.292}\ [\text{mm}]$$

As shown in FIG. 7, this formula (9) is a formula representing approximation of a plot of crown radii Cr with which the backlash amount BL is the allowable value by the formula (5) versus facewidths B with which edge contact will not occur at either tooth end under these conditions, when a given inclination angle θ is set within the range of the numerical value setting mentioned above with the aforementioned condition taken into consideration.

When a given inclination angle θ determined by external factors is provided, increasing the crown radius Cr increases the facewidth B necessary for preventing edge contact and also increases the backlash amount BL.

When the inclination angle θ is given, the allowable maximum crown radius Cr and the minimum facewidth B can be obtained by selecting a combination of a crown radius Cr and a facewidth B based on the condition of the formula (9). Thus, the crown radius Cr is set to or below the allowable maximum value, and the facewidth B is set to the minimum value with which edge contact will not occur under the condition where that crown radius Cr is given. This can be mathematically expressed by the following formula.

$$B\leq 18\times\exp(0.001\times Cr)\ [\text{mm}]$$

This embodiment has been described by using specific numerical values for the gear-spindle outer diameter D, the strength index $T/D^3$ of the allowable transmission torque $T_a$, the facewidth B, the inclination angle θ, and the module Mn for the sake of explanation. However, the present invention is not limited to these numerical values. The diameters of the work roll and the gear spindle can be made smaller than the conventional case by utilizing a special feature which is a combination of a crown radius Cr and a facewidth B within a range surrounded by the curved and straight lines $Cr_1$, $B_{20}$, $B_{30}$, $Cr_2$, and $B_1$ shown in FIG. 7 to improve the strength of the gear spindle.

Moreover, the present invention has been introduced mainly as a gear spindle suitable for rolling high tensile strength steels. However, the gear spindle and the rolling mill equipped with the same according to this embodiment achieve improved allowable transmission torque performance, and the range of its application is wide. Thus, the gear spindle and the rolling mill equipped with the same according to this embodiment are applicable to the rolling of rolling materials with lower hardness than high, tensile strength steels and of rolling materials with relatively high hardness.

There may be cases where the rolling mill is capable of applying sufficient rolling load for rolling ultra-high tensile strength steels without further reducing the diameters of the work rolls and gear spindles. In these cases, too, the gear spindle and the rolling mill equipped with the same according to this embodiment can, of course, roll the ultra-high tensile strength steels because the gear spindle and the rolling mill have improved allowable transmission torque performance.

EXPLANATION OF THE REFERENCE NUMERALS

1 ROLLING MILL
2 WORK ROLL
3 GEAR SPINDLE
4 TRANSMISSION
5 GEAR COUPLING
6 ELECTRIC MOTOR

10 MIDDLE SHAFT
11 NECK PORTION OF SPINDLE INNER TUBE
12 SPINDLE INNER TUBE (WORK ROLL SIDE)
13 SPINDLE INNER TUBE (TRANSMISSION SIDE)
20 SPINDLE OUTER TUBE (WORK ROLL SIDE)
30 SPINDLE OUTER TUBE (TRANSMISSION SIDE)
40 INNER-TUBE GEAR PORTION
41 FACEWIDTH CENTER
42 TOOTH SURFACE
43 TOOTH TIP
44 TOOTH END
45 BOTTOM LAND
50 OUTER-TUBE GEAR PORTION
51 TOOTH SURFACE
60 OVAL HOLE
61 OPEN END OF OVAL HOLE
62 SEPARATING WALL
63 LUBRICATING OIL CHAMBER
64 SEAL MEMBER
70 WORK-ROLL OVAL PORTION
80 SPEED-CHANGING/POWER-DISTRIBUTING GEAR SHAFT
90 CONTACTING SPOT
B FACEWIDTH
Cr CROWN RADIUS
R TOOTH TIP RADIUS
BL BACKLASH AMOUNT
D GEAR-SPINDLE OUTER DIAMETER
$D_P$ PITCH CIRCLE DIAMETER
$D_B$ ROOT DIAMETER
$D_W$ WORK ROLL DIAMETER
d NECK DIAMETER

The invention claimed is:

1. A gear spindle in which, an axis of a spindle inner tube and an axis of a spindle outer tube are inclined with respect to each other at 0.6 degrees to 1.6 degrees, the spindle inner tube having an inner-tube gear portion being an external gear on one end side, the spindle outer tube having an outer-tube gear portion being an internal gear configured to be fitted to the inner-tube gear portion, characterized in that
teeth of the inner-tube gear portion having a facewidth B are each provided with a crown of a radius Cr such that the tooth is thicker at the center and thinner at opposite tooth ends along a facewidth direction, and
the facewidth B and the crown radius Cr are set within a range defined by $Cr=1200$ [mm], $Cr=4000$ [mm], $B=0.0272 \times Cr+28$ [mm], $B=59.04 \times \exp(0.0005 \times Cr)$ [mm], and $B=32 \times Cr^{0.247}$ [mm] in a graph.

2. The gear spindle according to claim 1, characterized in that
$B=0.0272 \times Cr+28$ [mm] is a straight line obtained by connecting a large number of points each of which is a set of a given crown radius Cr and a minimum facewidth under a condition where the inclination angle is 0.6 degrees, the minimum facewidth being such that the teeth of the inner-tube spindle do not contact at the tooth ends thereof under the condition where the crown radius Cr is given.
$B=59.04 \times \exp(0.0005 \times Cr)$ [mm] is a curved line obtained by connecting a large number of points each of which is a set of a crown radius Cr and 40 [mm] plus a minimum facewidth under a condition where a given inclination angle is set within the range of 0.6 degrees to 1.6 degrees, the crown radius Cr being such that tooth-root bending stress to be applied to the inner-tube gear portion is a maximum allowable value, the minimum facewidth being such that the teeth of the spindle inner tube do not contact at the tooth ends thereof under the condition where the crown radius Cr is given, and
$B=32 \times Cr^{0.247}$ [mm] is a curved line obtained by connecting a large number of points each of which is a set of a given crown radius Cr and a facewidth B being 40 [mm] plus a minimum facewidth under a condition where a given inclination angle is set within the range of 0.6 degrees to 1.6 degrees, and a backlash required for the combination of the crown radius Cr and the facewidth B is an allowable maximum backlash between the inner-tube gear portion and the outer-tube gear portion, the minimum facewidth being such that the teeth of the inner-tube spindle do not contact at the tooth ends thereof under the condition where the crown radius Cr is given.

3. A gear spindle in which an axis of a spindle inner tube and an axis of a spindle outer tube are inclined, with respect to each other at 0.6 degrees to 1.6 degrees, the spindle inner tube having an inner-tube gear portion being an external gear on one end side, the spindle outer tube having an outer-tube gear portion being an internal gear configured to be fitted to the inner-tube gear portion, characterized in that
teeth of the inner-tube gear portion are each provided with a crown of a radius Cr such that the tooth is thicker at the center and thinner at opposite tooth ends along a facewidth direction, and
the facewidth B and the crown radius Cr are set within a range defined by $Cr=1200$ [mm], $Cr=4000$ [mm], $B=0.0272 \times Cr+28$ [mm], $B=18 \times \exp(0.001 \times Cr)$ [mm], and $B=19 \times Cr^{0.292}$ [mm] in a graph.

4. The gear spindle according to claim 3, characterized in that
$B=0.0272 \times Cr+28$ [mm] is a straight line obtained by connecting a large number of points each of which is a set of a given crown radius Cr and a minimum facewidth under a condition where the inclination angle is 0.6 degrees, the minimum facewidth being such that the teeth of the inner-tube spindle do not contact at the tooth ends thereof under the condition where the crown radius Cr is given.
$B=18 \times \exp(0.001 \times Cr)$ [mm] is a curved, line obtained by connecting a large number of points each of which is a set of a crown radius Cr and a. minimum facewidth under a condition, where a given inclination, angle is set within, the range of 0.6 degrees to 1.6 degrees, the crown radius Cr being such that tooth-root bending stress to be applied to the inner-tube gear portion is a maximum allowable value, the minimum facewidth being such that the teeth of the spindle inner tube do not contact at the tooth ends thereof under the condition where the crown radius Cr is given, and
$B=19 \times Cr^{0.292}$ [mm] is a curved line obtained by connecting a large number of points each of which is a set of a given crown radius Cr and a minimum facewidth under a condition where a given inclination angle is sec within the range of 0.6 degrees to 1.6 degrees, and a backlash required for the combination of the crown radius Cr and the facewidth B is an allowable maximum backlash between the inner-tube gear portion and the outer-tube gear portion, the minimum facewidth being such that the teeth of the inner-tube spindle do not contact at the tooth ends thereof under the condition where the crown radius Cr is given.

5. The gear spindle according to claim P characterized in that shot blasting is performed on tooth surfaces.

6. The gear spindle according to claim 1, characterized in that manganese phosphate coating treatment is performed on tooth surfaces.

7. The gear spindle according to claim 1, characterized in that molybdenum disulfide coating treatment is performed on tooth surfaces.

8. The gear spindle according to claim 1, characterized in that tooth surface lubricant and tooth surfaces of the spindle outer tube and the spindle inner tube are forcibly cooled by spraying cooling fluid onto outer surfaces of the spindle outer tube and the spindle inner tube.

9. The gear spindle according to claim 1, characterized in that given that a pitch circle diameter of the inner-tube gear portion is $D_P$ [mm], a gear pressure angle is $\alpha$ [degree], a gear module is Mn [mm], the crown radius is Cr [mm], the facewidth is B [mm], a minimum diameter of a portion from a tooth end portion of the inner-tube spindle to a neck portion thereof is d [mm], and a radius of curvature of an arc shape given at a tooth tip is R=Cr×tan $\alpha$[mm], $$d \geq D_P - 2 \times \left[ R - \left\{ R^2 - \left(\frac{B}{2}\right)^2 \right\}^{\frac{1}{2}} + (Mn + 5) \right] [\text{mm}] \quad \text{[Formula 1]}$$

is satisfied.

10. A rolling mill including: a pair of upper and lower work rolls for rolling a rolling target strip; a pair of upper and lower gear spindles coupled to the pair of upper and lower work rolls, independently and respectively, and configured to transmit rotational power so the pair of upper and lower work rolls, independently and respectively; a transmission coupled to the pair of upper and lower gear spindles; a gear coupling coupled to the transmission and configured to transmit rotational power to the transmission; and an electric motor coupled to the gear coupling and configured to supply rotational power to the gear coupling, characterized in that each of the gear spindles is the gear spindle according to claim 1.

* * * * *